US010873920B2

(12) United States Patent
Abedini et al.

(10) Patent No.: US 10,873,920 B2
(45) Date of Patent: Dec. 22, 2020

(54) TIMING AND FRAME STRUCTURE IN AN INTEGRATED ACCESS BACKHAUL (IAB) NETWORK

(71) Applicant: QUALCOMM Incorporated, San Diego, CA (US)

(72) Inventors: Navid Abedini, Somerset, NJ (US); Junyi Li, Chester, NJ (US); Karl Georg Hampel, Hoboken, NJ (US); Hong Cheng, Bridgewater, NJ (US); Jianghong Luo, Skillman, NJ (US); Juergen Cezanne, Ocean Township, NJ (US); Muhammad Nazmul Islam, Edison, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/154,500

(22) Filed: Oct. 8, 2018

(65) Prior Publication Data
US 2019/0110266 A1    Apr. 11, 2019

Related U.S. Application Data

(60) Provisional application No. 62/570,003, filed on Oct. 9, 2017.

(51) Int. Cl.
*H04W 56/00* (2009.01)
*H04L 27/26* (2006.01)
(Continued)

(52) U.S. Cl.
CPC ...... *H04W 56/0015* (2013.01); *H04B 7/2606* (2013.01); *H04L 5/0048* (2013.01);
(Continued)

(58) Field of Classification Search
CPC .............. H04W 56/00; H04W 56/001; H04W 56/0015; H04W 56/002; H04W 56/0045;
(Continued)

(56) References Cited

U.S. PATENT DOCUMENTS

| 8,848,596 B2* | 9/2014 | Shin | H04B 7/15528 |
| | | | 370/315 |
| 9,054,835 B2* | 6/2015 | Kwon | H04W 74/004 |

(Continued)

FOREIGN PATENT DOCUMENTS

| WO | WO-2010050731 A2 | 5/2010 |
| WO | WO-2015076585 A1 | 5/2015 |
| WO | WO-2016172925 A1 | 11/2016 |

OTHER PUBLICATIONS

International Search Report and Written Opinion—PCT/US2018/055094—ISA/EPO—dated Apr. 2, 2019.
(Continued)

*Primary Examiner* — Tri H Phan
(74) *Attorney, Agent, or Firm* — Qualcomm IP Dept.; James Hunt Yancey, Jr.

(57) ABSTRACT

Wireless communications systems and methods related to communicating in an integrated access backhaul (IAB) network are provided. A first wireless communication device receives synchronization information associated with one or more wireless relay devices. The first wireless communication device adjusts one or more synchronization references of the first wireless communication device based on at least a subset of the received synchronization information. The first wireless communication device communicates, with the one or more wireless relay devices, communication signals in synchronization with the one or more adjusted synchronization references, wherein at least one of the communication signals includes backhaul data.

38 Claims, 16 Drawing Sheets

(51) Int. Cl.
*H04L 5/00* (2006.01)
*H04W 72/10* (2009.01)
*H04B 7/26* (2006.01)
*H04W 72/04* (2009.01)
*H04L 12/715* (2013.01)

(52) U.S. Cl.
CPC ........ *H04L 5/0053* (2013.01); *H04L 27/2607* (2013.01); *H04L 45/04* (2013.01); *H04L 45/64* (2013.01); *H04W 56/001* (2013.01); *H04W 56/002* (2013.01); *H04W 56/0045* (2013.01); *H04W 72/0446* (2013.01); *H04W 72/10* (2013.01); *H04W 56/00* (2013.01)

(58) Field of Classification Search
CPC .............. H04W 72/0446; H04W 72/10; H04B 7/2606; H04B 7/269; H04B 7/2125; H04B 7/2662; H04B 7/2665; H04B 7/2668; H04B 7/2671; H04B 7/2675; H04B 7/2678; H04B 7/2681; H04B 7/2684; H04B 7/2687; H04B 7/2693; H04L 5/00; H04L 5/0048; H04L 5/0053; H04L 27/26; H04L 27/2607; H04L 45/04; H04L 45/64; H04L 25/20; H04L 25/44; H04L 25/247; H04L 27/32; H04L 27/2655; H04L 27/2656; H04L 27/2657; H04L 29/0854; H04L 2001/0097; H04L 2012/5674
See application file for complete search history.

(56) References Cited

U.S. PATENT DOCUMENTS

| | | | | |
|---|---|---|---|---|
| 9,537,637 | B2* | 1/2017 | Nam | H04L 1/1819 |
| 10,004,050 | B2* | 6/2018 | Ryu | H04W 56/0075 |
| 10,172,071 | B2* | 1/2019 | Abedini | H04W 56/004 |
| 10,206,232 | B2* | 2/2019 | Novlan | H04B 7/15507 |
| 10,321,436 | B2* | 6/2019 | Yu | H04B 7/024 |
| 10,433,269 | B2* | 10/2019 | Ng | H04L 5/0007 |
| 10,588,101 | B2* | 3/2020 | Malladi | H04W 16/26 |
| 10,687,375 | B2* | 6/2020 | Novlan | H04W 56/001 |
| 2002/0054611 | A1 | 5/2002 | Seta | |
| 2002/0126706 | A1 | 9/2002 | Laroia et al. | |
| 2007/0110005 | A1 | 5/2007 | Jin et al. | |
| 2008/0014960 | A1 | 1/2008 | Chou | |
| 2008/0285473 | A1 | 11/2008 | Chen et al. | |
| 2009/0290511 | A1 | 11/2009 | Budampati et al. | |
| 2010/0074180 | A1 | 3/2010 | Palanki et al. | |
| 2010/0113086 | A1 | 5/2010 | Chang et al. | |
| 2010/0150022 | A1 | 6/2010 | Cai et al. | |
| 2010/0260168 | A1 | 10/2010 | Gheorghiu et al. | |
| 2010/0260169 | A1 | 10/2010 | Gheorghiu et al. | |
| 2011/0069656 | A1 | 3/2011 | Choi et al. | |
| 2011/0176483 | A1 | 7/2011 | Palanki et al. | |
| 2011/0211522 | A1 | 9/2011 | Chung et al. | |
| 2011/0256825 | A1 | 10/2011 | Min et al. | |
| 2011/0299614 | A1 | 12/2011 | Kim et al. | |
| 2011/0310747 | A1 | 12/2011 | Seo et al. | |
| 2012/0236977 | A1 | 9/2012 | Zou et al. | |
| 2013/0010668 | A1 | 1/2013 | Lin et al. | |
| 2013/0040674 | A1 | 2/2013 | Chang et al. | |
| 2013/0122917 | A1 | 5/2013 | Yavuz et al. | |
| 2013/0142106 | A1 | 6/2013 | Zhang et al. | |
| 2013/0159554 | A1 | 6/2013 | Kim et al. | |
| 2013/0185617 | A1 | 7/2013 | Roh et al. | |
| 2014/0213244 | A1* | 7/2014 | Oh | H04W 24/02 455/419 |
| 2014/0334399 | A1 | 11/2014 | Xu et al. | |
| 2014/0348104 | A1 | 11/2014 | Morita | |
| 2015/0023439 | A1 | 1/2015 | Dimou et al. | |
| 2015/0223124 | A1 | 8/2015 | Wang et al. | |
| 2015/0304016 | A1 | 10/2015 | Choi et al. | |
| 2018/0092139 | A1 | 3/2018 | Novlan et al. | |
| 2018/0098296 | A1 | 4/2018 | Wang et al. | |
| 2019/0109745 | A1* | 4/2019 | Abedini | H04W 56/0015 |
| 2019/0110268 | A1 | 4/2019 | Abedini et al. | |
| 2019/0141617 | A1* | 5/2019 | Abedini | H04B 7/0617 |
| 2019/0141762 | A1* | 5/2019 | Novlan | H04W 76/12 |
| 2019/0159156 | A1* | 5/2019 | Abedini | H04L 5/0048 |
| 2019/0268817 | A1* | 8/2019 | Seo | H04W 36/08 |

OTHER PUBLICATIONS

Partial International Search Report—PCT/US2018/055094—ISA/EPO—dated Jan. 23, 2019.

* cited by examiner

TIMING AND FRAME STRUCTURE IN AN INTEGRATED ACCESS BACKHAUL (IAB) NETWORK

CROSS REFERENCE TO RELATED APPLICATIONS

The present application claims priority to and the benefit of U.S. Provisional Patent Application No. 62/570,003, filed Oct. 9, 2017, which is hereby incorporated by reference in its entirety as if fully set forth below and for all applicable purposes.

TECHNICAL FIELD

This application generally relates to wireless communication systems, and more particularly to communicating access data and backhaul data over wireless links in an integrated access backhaul (IAB) network. Embodiments of the technology can enable and provide solutions and techniques for wireless communication devices (e.g., base stations and user equipment devices (UEs)) in an IAB network to maintain synchronization and determine transmission and/or reception timelines and frame structures for communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a fifth generation (5G) new radio (NR) technology. 5G NR may provision for access traffic and backhaul traffic at gigabit-level throughput. Access traffic refers to traffic between an access node (e.g., a base station) and a UE. Backhaul traffic refers to traffic among access nodes and a core network.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for communicating in an integrated access backhaul (IAB) network employing a multi-hop topology (e.g., a spanning tree) to transport radio access traffic and backhaul traffic. For example, a BS or a UE may function as a relay node (e.g., a parent node or a child node) and at least one BS in direct communication with a core network may function as a root node. A relay node may exchange synchronization information with one or more other relay nodes, adjust an internal synchronization reference, and/or determine transmission and/or reception timelines and/or frame structures (e.g., gap periods and cyclic prefixes (CPs)) for communicating radio access traffic and/or backhaul traffic with the one or more other relay nodes.

For example, in an aspect of the disclosure, a method of wireless communication includes receiving, by a first wireless communication device, synchronization information associated with one or more wireless relay devices. The method includes adjusting, by the first wireless communication device, one or more synchronization references of the first wireless communication device based on at least a subset of the received synchronization information. The method includes communicating, by the first wireless communication device with the one or more wireless relay devices, communication signals in synchronization with the one or more adjusted synchronization references, wherein at least one of the communication signals includes backhaul data.

In an additional aspect of the disclosure, a method of wireless communication includes receiving, by a central entity from one or more wireless relay devices, synchronization information associated with the one or more wireless relay devices. The method includes determining, by the central entity, a synchronization reference adjustment for a first wireless relay device of the one or more wireless relay devices based on at least a subset of the received synchronization information. The method includes transmitting, by the central entity, a message instructing the first wireless relay device of the one or more wireless relay devices to synchronize a communication with a second wireless relay device of the one or more wireless relay devices based on the synchronization reference adjustment.

In an additional aspect of the disclosure, an apparatus includes a transceiver configured to a transceiver configured to receive synchronization information associated with one or more wireless relay devices. The processor further includes a processor configured to adjust one or more synchronization references of the apparatus based on at least a subset of the received synchronization information. The transceiver is further configured to communicate, with the one or more wireless relay devices, communication signals in synchronization with the one or more adjusted synchronization references, wherein at least one of the communication signals includes backhaul data.

In an additional aspect of the disclosure, an apparatus includes a transceiver configured to receive, from one or more wireless relay devices, synchronization information associated with the one or more wireless relay devices. The apparatus further includes a processor configured to determine a synchronization reference adjustment for a first wireless relay device of the one or more wireless relay devices based on at least a subset of the received synchronization information. The transceiver is further configured to transmit a message instructing the first wireless relay device of the one or more wireless relay devices to synchronize a communication with a second wireless relay device of the one or more wireless relay devices based on the synchronization reference adjustment.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
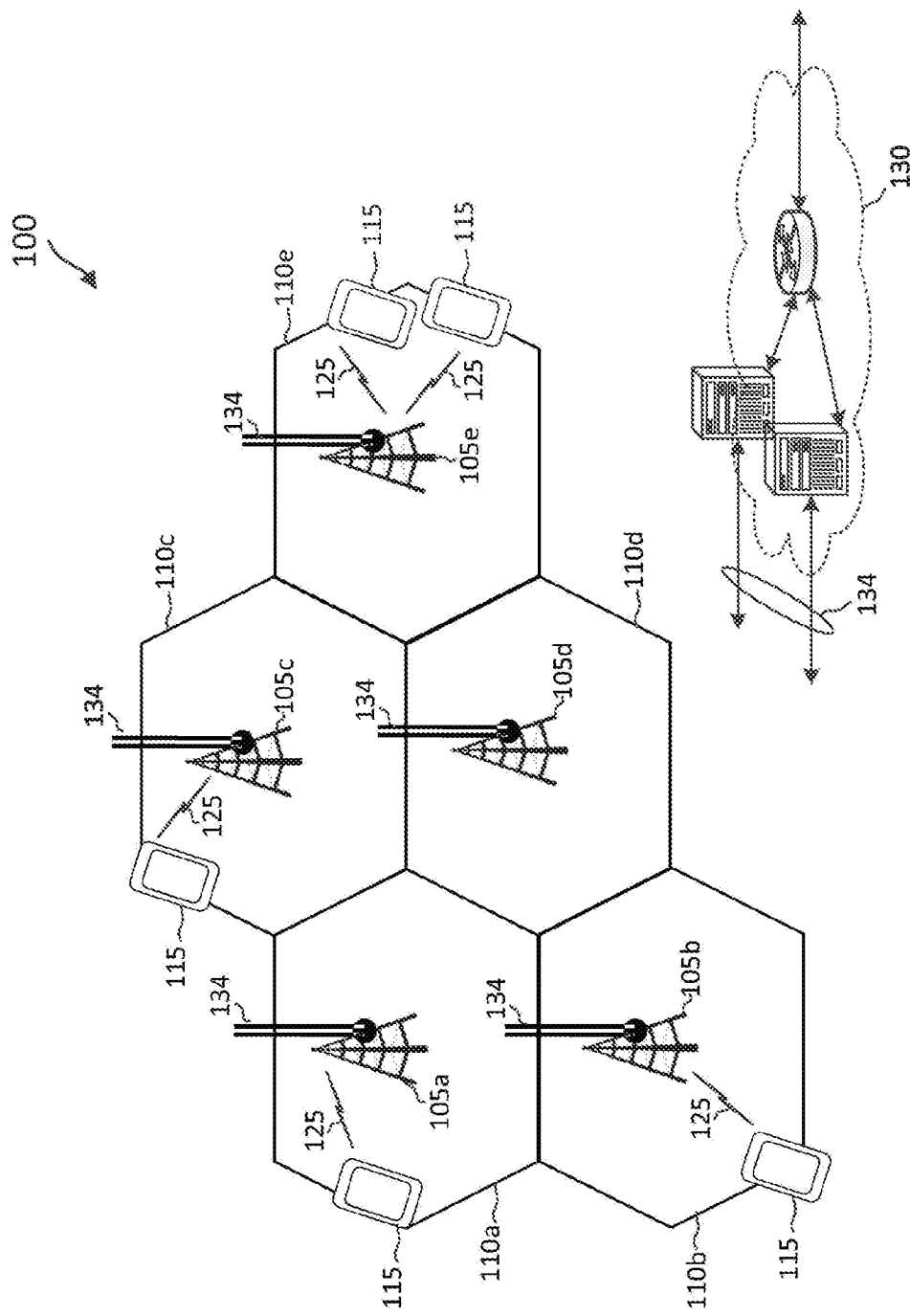
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

Techniques described herein may be used for various wireless communication networks. These networks can include code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation network including 5G NR. Some 5G NR networks (aka (e.g., 5th Generation) (5G) operating in mmWave bands) can operate in a variety of frequency bands (e.g., mmWave or sub-6 Ghz) that covers both licensed and unlicensed spectrum.

The present disclosure describes mechanisms and techniques for communicating in an IAB network. An IAB network may include a combination of wireless access links between BSs and UEs and wireless backhaul links between the BSs. The IAB network may employ a multi-hop topology (e.g., a spanning tree) for transporting access traffic and backhaul traffic. One of the BSs may be configured with an optical fiber connection in communication with a core network. In some scenarios a BS may function as an anchoring node (e.g., a root node) to transport backhaul traffic between a core network and the IAB network. In other scenarios one BS may serve the role of a central node in conjunction with connections to a core network. And in some arrangements, BSs and the UEs may be referred to as relay nodes in the network.

BSs can serve a variety of roles in a network in either a static or dynamic nature. For example, each BS may have one or more parent nodes. These parent nodes can include other BSs. BSs may have one or more child nodes, which may include other BSs and/or UEs. The UEs may function as child nodes. Parent nodes may function as access nodes to child nodes. Parent nodes may be referred to as access functionality (ACF)-nodes. Child nodes may function as UEs to parent nodes and may be referred to as UE functionality (UEF)-nodes. BSs may function as an ACF-node when communicating with a child node and may function as a UEF-node when communicating with a parent node. The disclosed embodiments generally provide signaling mechanisms for nodes in an IAB network to maintain synchronization and determine transmission and/or reception timelines and frame structures for communications. Given a variety of topological arrangements of IAB networks and constraints/demands placed on a network synchronization helps overall network functions and performance for positive user experiences.

In an embodiment, a relay node may maintain and track one or more synchronization references for communications in a network. A synchronization reference can be an internal reference at a node or an external reference such as a global positioning system (GPS) connected to the node. Relay nodes may exchange synchronization information, for example, via messages or reference signals. A central entity can collect synchronization reports from the relay nodes and configure the relay nodes with synchronization adjustments. Thus, a relay node may adjust an internal synchronization reference based on synchronization information received from other relay nodes, timing information received from a GPS, adjustments received from a central entity, and/or adjustments received from a particular relay node selected by the central entity. Accordingly, the present disclosure provides techniques for over-the-air (OTA) synchronization in a multi-hop IAB network.

In an embodiment, when a relay node functions as an ACF-node, the relay node may determine or utilize a number of parameters. These can include gap periods, transmit timing, receiving time, and/or cyclic prefix (CP) mode (e.g., a normal CP mode or an extended CP (ECP) mode) for communicating with corresponding UEF-nodes. In an embodiment, a central entity may determine adjustment information including gap periods, transmit timing adjustment, receiving time adjustment, and/or CP mode for the relay nodes to communicate with each other and may provide the adjustment information to the relay nodes.

Aspects of the technology discussed herein can provide several benefits. For example, the use of ACF-UEF relationships among the relay nodes can leverage at least some of the current LTE technologies, such as scheduling and timing advance mechanisms. The use of multiple synchronization references and exchange of synchronization information allows the nodes to synchronize with each other and synchronize to a reliable synchronization source (e.g., a GPS). The flexibility of selecting between an ECP mode, a gap period insertion, and/or a transmit and/or receive timing adjustment can avoid interference and increase resource utilization efficiency. These and other benefits are more fully recognized and discussed below.

FIG. 1 illustrates a wireless communication network 100 according to embodiments of the present disclosure. The network 100 includes a plurality of BSs 105, a plurality of UEs 115, and a core network 130. The network 100 may be a LTE network, a LTE-A network, a millimeter wave (mmW) network, a new radio (NR) network, a 5G network, or any other successor network to LTE.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In the example shown in FIG. 1, the BSs 105a, 105b, 105c, 105d, and 105e are examples of macro BSs for the coverage areas 110a, 110b, 110c, 110d, and 110e, respectively.

Communication links 125 shown in the network 100 may include uplink (UL) transmissions from a UE 115 to a BS 105, or downlink (DL) transmissions, from a BS 105 to a UE 115. The communication links 125 are referred to as wireless access links. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another via optical fiber links 134. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through the backhaul links 134 (e.g., S1, S2, etc.) and may perform radio configuration and scheduling for communication with the UEs 115. In various examples, the BSs 105 may communicate, either directly or indirectly (e.g., through core network 130), with each other over the backhaul links 134 (e.g., X1, X2, etc.).

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication tha UL communication. A UL-centric subframe may include a longer duration for UL communication tha UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

Figure 2:
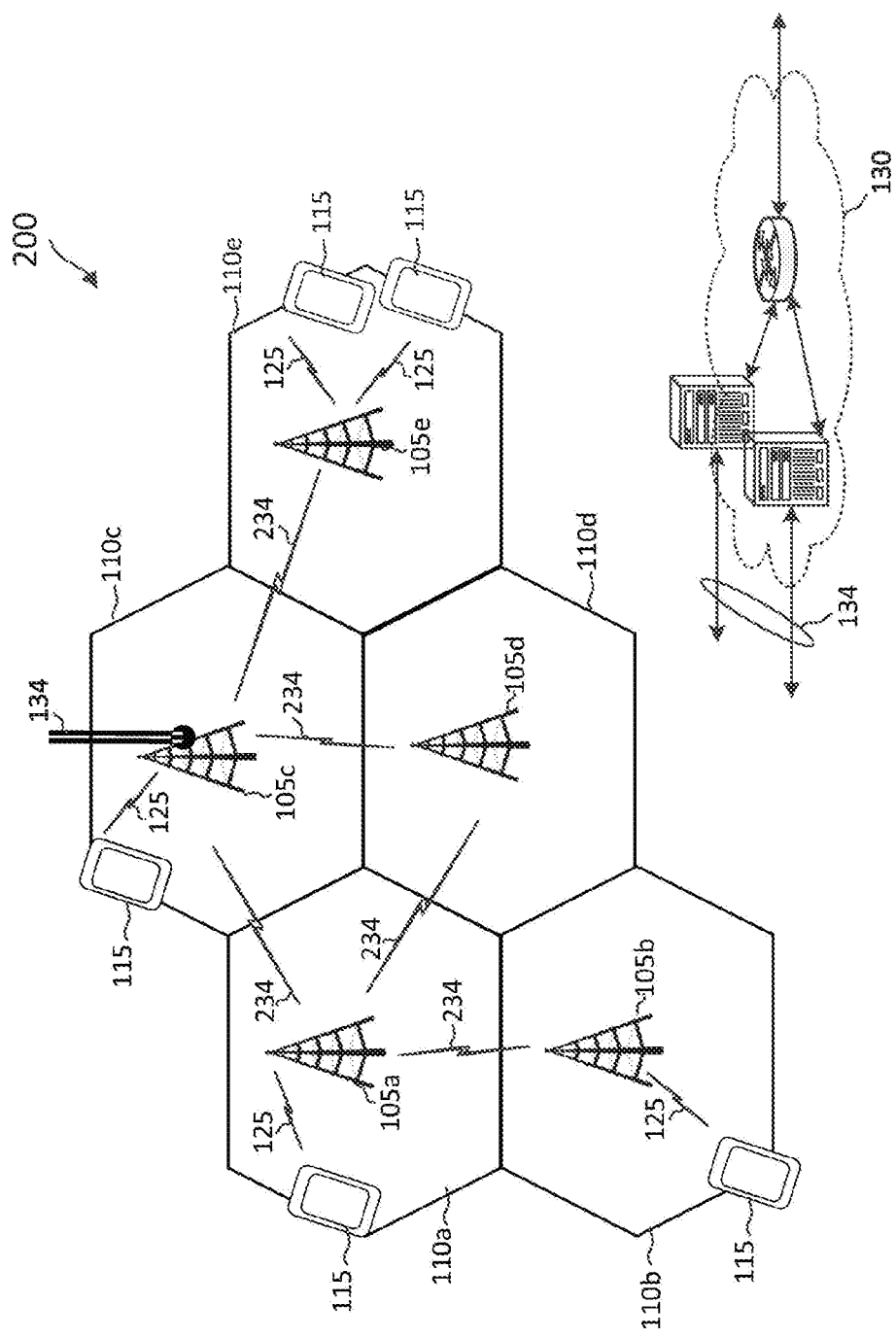
FIG. 2 illustrates an integrated access backhaul (IAB) network according to embodiments of the present disclosure.

FIG. 2 illustrates an IAB network 200 according to embodiments of the present disclosure. The network 200 is substantially similar to the network 100. For example, the BSs 105 communicates with the UEs 115 over the wireless access links 125. However, in the network 200, only one BS (e.g., the BS 105*c*) is connected to an optical fiber backhaul link 134. The other BSs 105*a*, 105*b*, 105*d*, and 105*e* wirelessly communicate with each other and with the BS 105*c* over wireless backhaul links 234. The BS 105*c* connected to the optical fiber backhaul link 134 may function as an anchor for the other BSs 105*a*, 105*b*, 105*d*, and 105*e* to communicate the core network 130, as described in greater detail herein. The wireless access links 125 and the wireless backhaul links 234 may share resources for communications in the network 200. The network 200 may also be referred to as a self-backhauling network. The network 200 can improve wireless link capacity, reduce latency, and reduce deployment cost.

Figure 3:
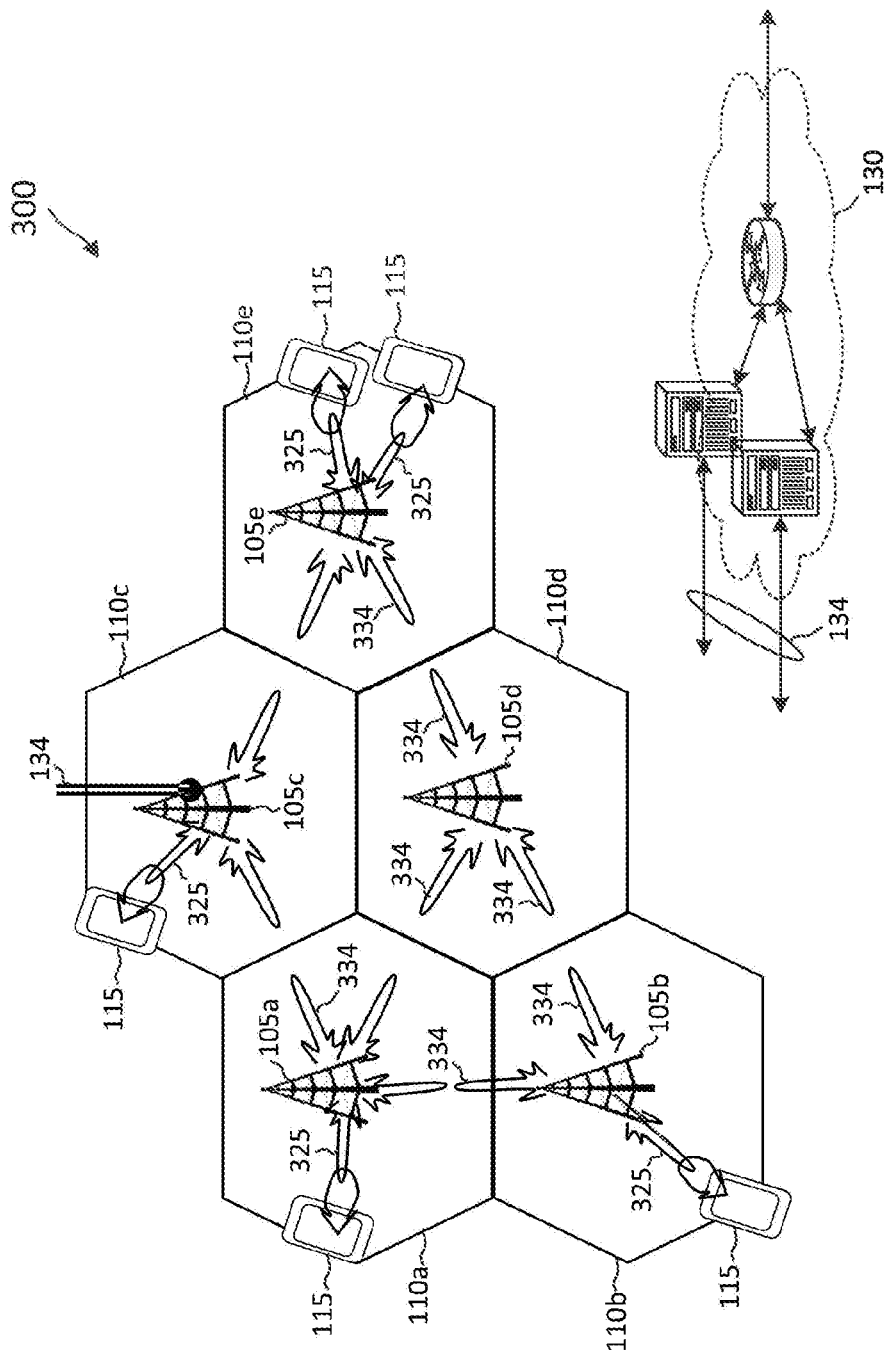
FIG. 3 illustrates an IAB network according to embodiments of the present disclosure.

FIG. 3 illustrates an IAB network 300 according to embodiments of the present disclosure. The network 300 is similar to the network 200 and illustrates the use of millimeter wave (mmWav) frequency band for communications. In the network 300, a single BS (e.g., the BS 105*c*) is connected to an optical fiber backhaul link 134. The other BSs 105*a*, 105*b*, 105*d*, and 105*e* communicate with each other and with the BS 105*c* using directional beams 334, for example, over the wireless links 234. The BSs 105 may also communicate with the UEs 115 using narrow directional beams 325, for example, over the wireless links 125. The directional beams 334 may be substantially similar to the directional beams 325. For example, the BSs 105 may use analog beamforming and/or digital beamforming to form the directional beams 334 and 325 for transmission and/or reception. Similarly, the UEs 115 may use analog beamforming and/or digital beamforming to form the directional beams 325 for transmission and/or reception. The use of mmmWav can increase network throughput and reduce latency. The use of narrow directional beams 334 and 325 can minimize inter-link interference. Thus, the network 300 can improve system performance.

Figure 4:
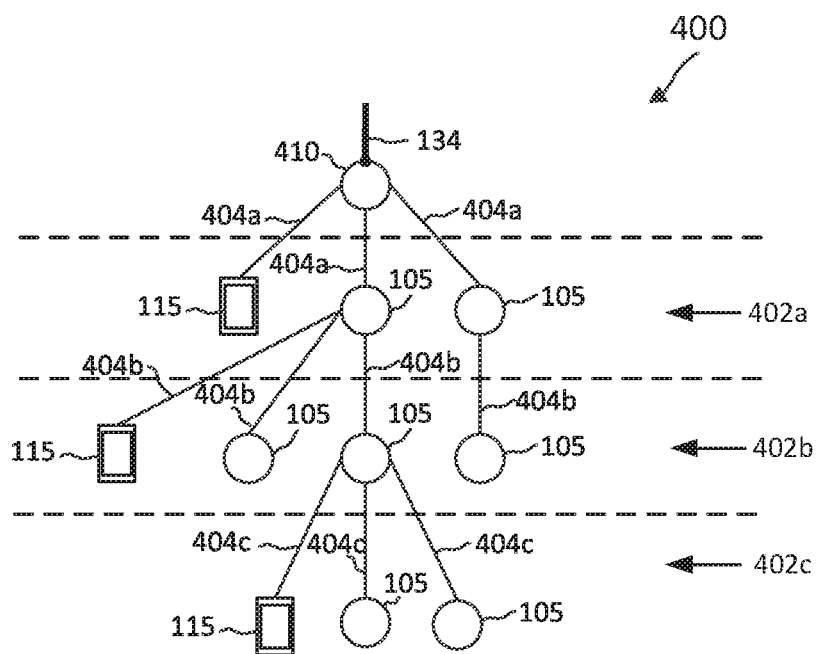
FIG. 4 illustrates an IAB network topology according to embodiments of the present disclosure.

FIG. 4 illustrates an IAB network topology 400 according to embodiments of the present disclosure. The topology 400 can be employed by the networks 200 and 300. For example, the BSs 105 and the UEs 115 can be configured to form a logical spanning tree configuration as shown in the topology 400 for communicating access traffic and/or backhaul traffic. The topology 400 may include an anchor 410 coupled to an optical fiber link 134 for communication with a core network (e.g., the core network 130). The anchor 410 may correspond to the BS 105c in the networks 200 and 300.

The topology 400 includes a plurality of logical levels 402. In the example of FIG. 4, the topology 400 includes three levels 402, shown as 402a, 402b, and 402c. In some other embodiments, the topology 400 can include any suitable number of levels 402 (e.g., two, three, four, five, or six). Each level 402 may include a combination of UEs 115 and BSs 105 interconnected by logical links 404, shown as 404a, 404b, and 404c. For example, a logical link 404 between a BS 105 and a UE 115 may correspond to a wireless access link 125, whereas a logical link 404 between two BSs 105 may correspond to a wireless backhaul link 234. The BSs 105 and the UEs 115 may be referred to as relay nodes in the topology 400.

The nodes (e.g., the BSs 105) in the level 402a can function as relays for the nodes in the level 402b, for example, to relay backhaul traffic between the nodes and the anchor 410. Similarly, the nodes (e.g., the BSs 105) in the level 402b can function as relays for the nodes in the level 402c. For example, the nodes in the level 402a are parent nodes to the nodes in the level 402b, and the nodes in the level 402c are child nodes to the nodes in level 402b. The parent nodes may function as ACF-nodes and the child nodes may function as UEF-nodes.

For example, a BS 105 may implement both ACF and UEF and may function as an ACF-node and an UEF-node depending on which node the BS is communicating with. For example, a BS 105 (shown as pattern-filled) in the level 402b may function as an access node when communicating with a BS 105 or a UE 115 in the level 402c. Alternatively, the BS 105 may function as a UE when communicating with a BS 105 in the level 402a. When a communication is with a node in a higher level or with a less number of hops to the anchor 410, the communication is referred to as a UL communication. When a communication is with a node in a lower level or with a greater number of hops to the anchor 410, the communication is referred to as a DL communication. In some embodiments, the anchor 410 may allocate resources for the links 404. Mechanisms for scheduling UL and DL transmissions and/or allocating resources based on the topology 400 are described in greater detail herein.

Figure 5:
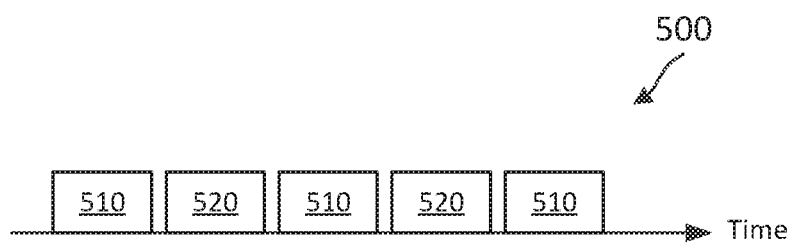
FIG. 5 illustrates an IAB network resource sharing method according to embodiments of the present disclosure.

FIG. 5 illustrates an IAB network resource sharing method 500 according to embodiments of the present disclosure. The method 500 illustrates resource partitioning for use in the topology 400. In FIG. 5, the x-axis represents time in some constant units. The method 500 time-partition resources in an IAB network (e.g., the networks 200 and 300) into resources 510 and 520. The resources 510 and 520 can include time-frequency resources. For example, each resource 510 or 520 may include a number of symbols (e.g., OFDM symbols) in time and a number of subcarriers in frequency. In some embodiments, each resource 510 or 520 shown may correspond to a subframe, a slot, or a transmission time interval (TTI), which may carry one media access control (MAC) layer transport block.

As an example, the method 500 may assign the resources 510 to the links 404a and 404c in the topology 400 for communicating UL and/or DL traffic. The method 500 may assign the resources 520 to the links 404b in the topology 400 for communicating UL and/or DL traffic. The time-partitioning of the resources in the alternating manner shown in the method 500 can reduce interference between the different levels 402, overcome the half-duplex constraint, and reduce transmit-receive gap periods.

Figure 6:
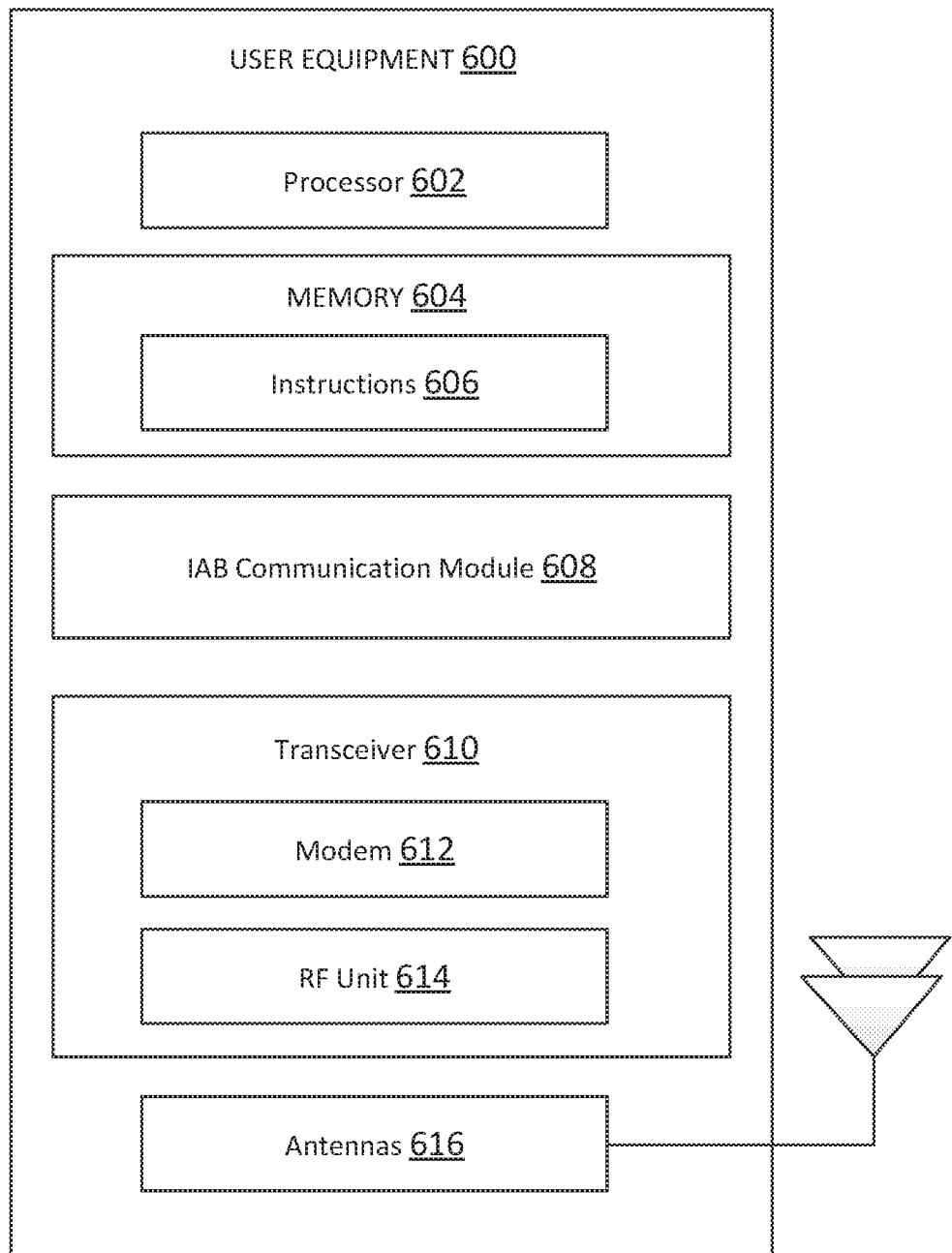
FIG. 6 is a block diagram of an exemplary user equipment (UE) according to embodiments of the present disclosure.

FIG. 6 is a block diagram of an exemplary UE 600 according to embodiments of the present disclosure. The UE 600 may be a UE 115 as discussed above. As shown, the UE 600 may include a processor 602, a memory 604, an IAB communication module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with embodiments of the present disclosure. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The IAB communication module 608 may be implemented via hardware, software, or combinations thereof. For example, the IAB communication module 608 may be implemented as a processor, circuit, and/or instructions 606 stored in the memory 604 and executed by the processor 602. The IAB communication module 608 may be used for various aspects of the present disclosure. For example, the IAB communication module 608 is configured to maintain multiple synchronization references, provide synchronization information (e.g., including timing and/or frequency) associated with the synchronization references to other nodes (e.g., the BSs 105), receive synchronization information from other nodes, receive synchronization adjustment commands, receive scheduling information (e.g., gap periods, transmission timing, and/or reception timing), adjust synchronization references based on the received synchronization information and/or the received commands, and/or communicate with other nodes based on received scheduling information, as described in greater detail herein.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the IAB communication module 608 according to a modulation and coding method (MCS), e.g., a low-density parity check (LDPC) coding method, a turbo coding method, a convolutional coding method, a digital beamforming method, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of reservation signals, reservation response signals, and/or any communication signal according to embodiments of the present disclosure. The antennas 616 may further receive data messages transmitted from other devices. This may include, for example, reception of synchronization information, synchronization adjustment commands, and/or scheduling adjustment information according to embodiments of the present disclosure. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

Figure 7:
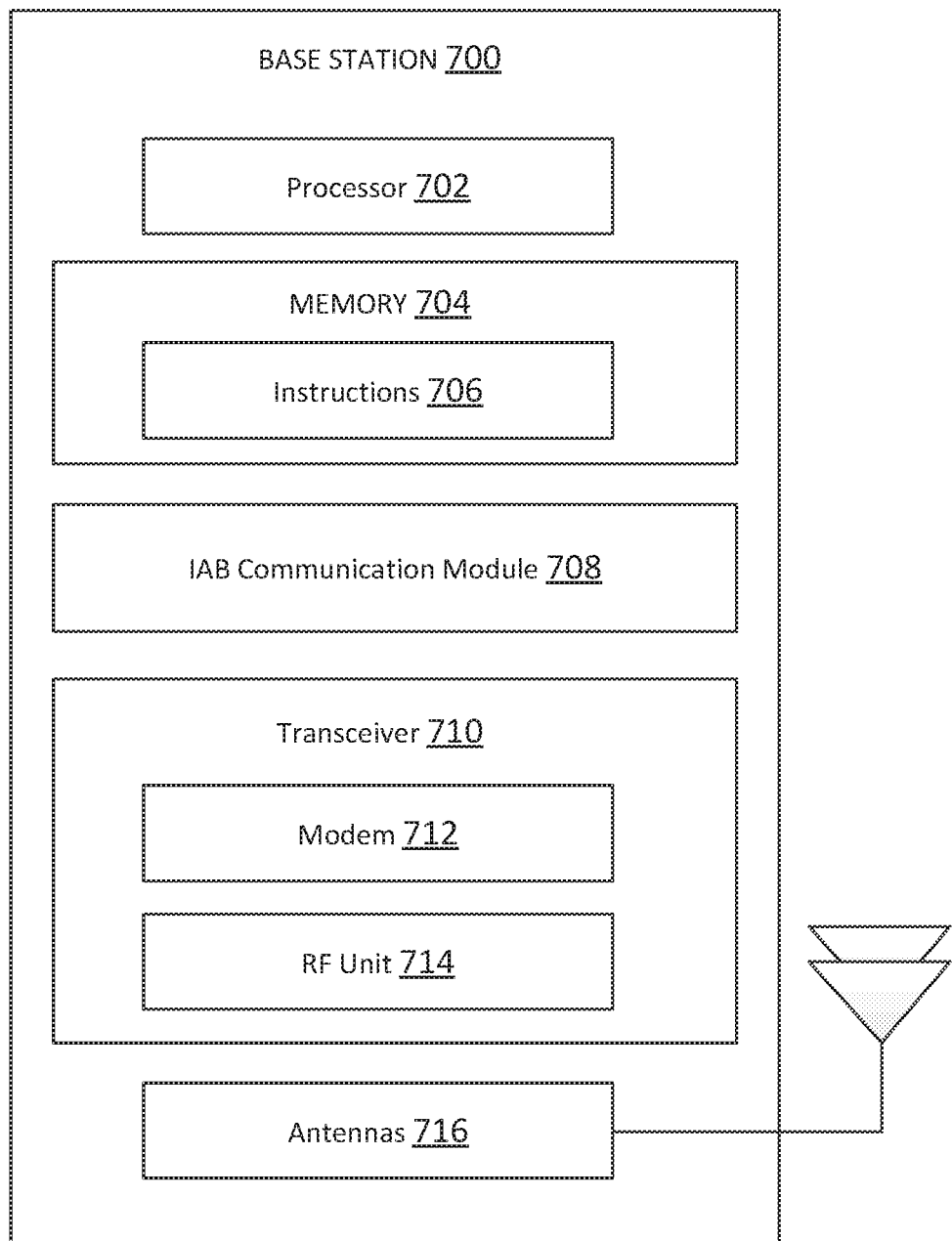
FIG. 7 is a block diagram of an exemplary base station (BS) according to embodiments of the present disclosure.

FIG. 7 is a block diagram of an exemplary BS 700 according to embodiments of the present disclosure. The BS 700 may be a BS 105 as discussed above. A shown, the BS 700 may include a processor 702, a memory 704, a IAB communication module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 704 may include a non-transitory computer-readable medium. The memory 704 may store instructions 706. The instructions 706 may include instructions that, when executed by the processor 702, cause the processor 702 to perform operations described herein. Instructions 706 may also be referred to as code, which may be interpreted broadly to include any type of computer-readable statement(s) as discussed above with respect to FIG. 7.

The IAB communication module 708 may be implemented via hardware, software, or combinations thereof. For example, the IAB communication module 708 may be implemented as a processor, circuit, and/or instructions 706 stored in the memory 604 and executed by the processor 702. The IAB communication module 708 may be used for various aspects of the present disclosure. For example, the IAB communication module 708 is configured to maintain multiple synchronization references, provide synchronization information (e.g., including timing and/or frequency) associated with the synchronization references to other nodes (e.g., the BSs 105 and the UEs 115 and 600), receive synchronization information from other nodes, receive synchronization adjustment commands, adjust synchronization references based on the received synchronization information or the received commands, receive scheduling information (e.g., gap periods, transmission timing, and/or reception timing) for communication with nodes at a higher level (e.g., less hops away from an anchor 410 than the BS 700), determine scheduling information for communication with nodes at a lower level (e.g., more hops away from an anchor 410 than the BS 700), and/or communicate with nodes based on the received scheduling information and the determined scheduling information, as described in greater detail herein.

As shown, the transceiver 710 may include the modem subsystem 712 and the RF unit 714. The transceiver 710 can be configured to communicate bi-directionally with other devices, such as the UEs 115 and/or another core network element. The modem subsystem 712 may be configured to modulate and/or encode data according to a MCS, e.g., a LDPC coding method, a turbo coding method, a convolutional coding method, a digital beamforming method, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115. The RF unit 714 may be further configured to perform analog beamforming in conjunction with the digital beamforming. Although shown as integrated together in transceiver 710, the modem subsystem 712 and the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 according to embodiments of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

Figure 8:
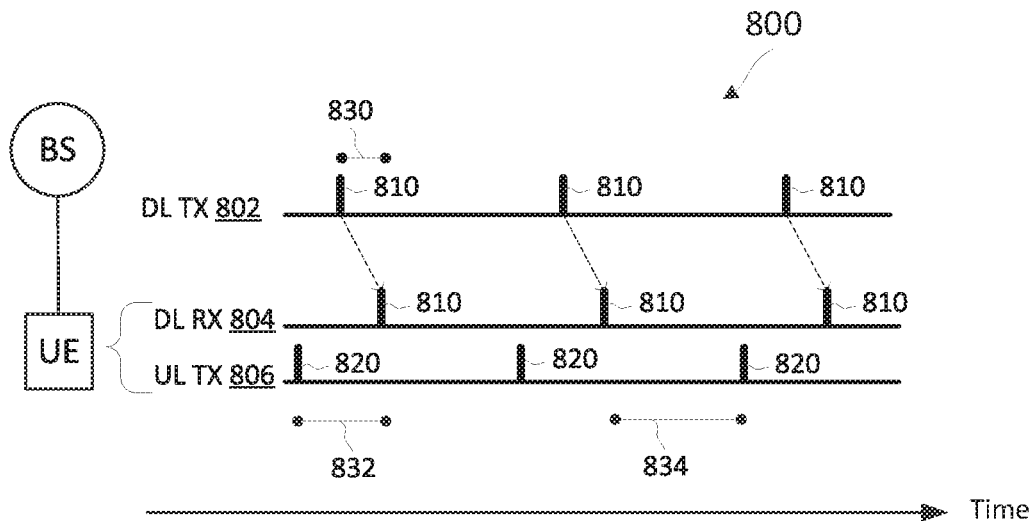
FIG. 8 is a timing diagram illustrating a scheduling method for a wireless access network according to embodiments of the present disclosure.
Figure 9:
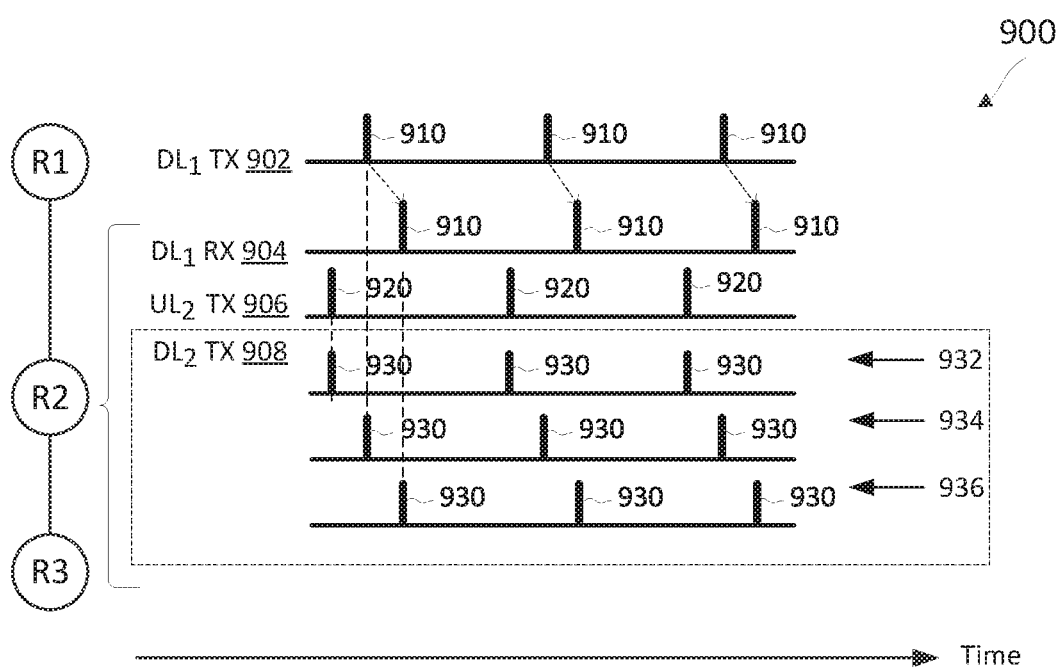
FIG. 9 is a timing diagram illustrating a scheduling method for an IAB network according to embodiments of the present disclosure.
Figure 10:
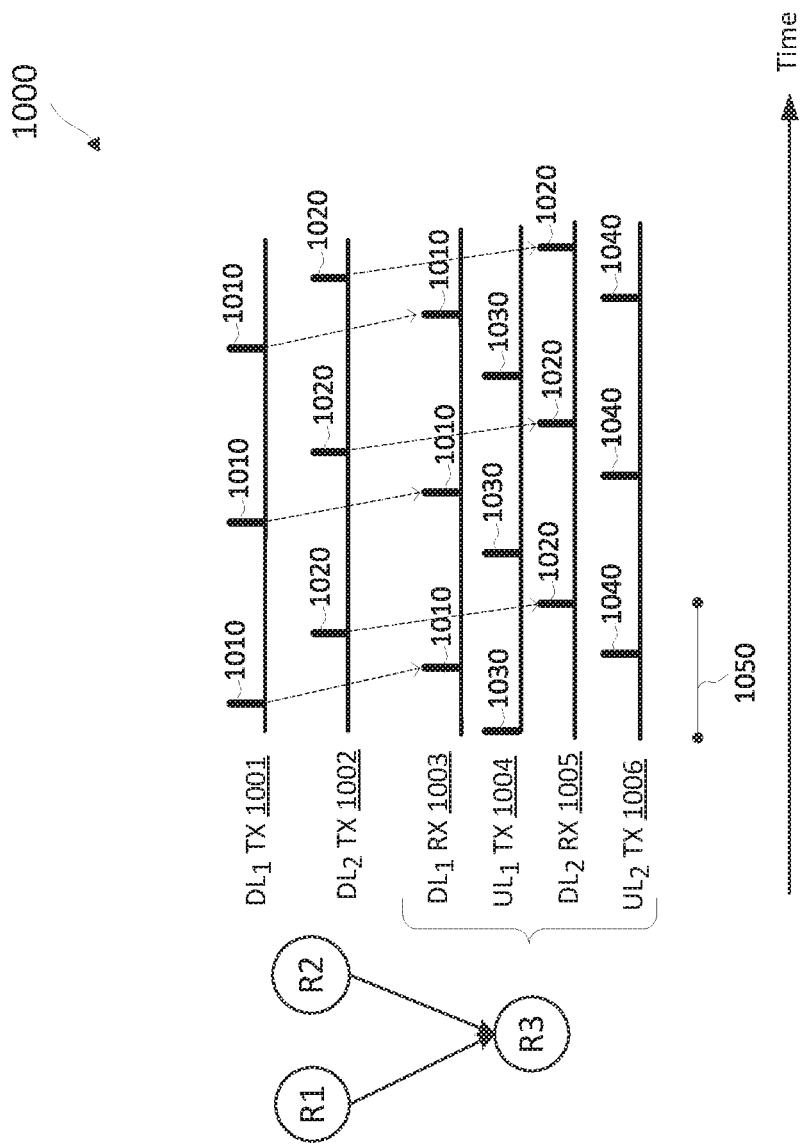
FIG. 10 is a timing diagram illustrating a scheduling method for an IAB network according to embodiments of the present disclosure.

FIGS. 8-10 illustrate various timelines for communicating over wireless access links (e.g., the wireless access links 125) and wireless backhaul links (e.g., the wireless backhaul links 234). In FIGS. 8-10, the x-axes represent time in some constant units. The illustrated timelines set forth how various method embodiments can be implemented and are described in detail below.

FIG. 8 is a timing diagram illustrating a scheduling method 800 for a wireless access network according to embodiments of the present disclosure. The method 800 may be employed by a BS (e.g., the BSs 105) to communicate with a UE (e.g., the UEs 115) over a wireless access link (e.g., the wireless access links 125). The method 800 is illustrated with one UE for simplicity of discussion, but may be scaled to include any suitable number of UEs (e.g., five, ten, twenty, or more than twenty).

The method 800 generally shows BS/UE communications via the vertical lines shown in the drawing. As shown, in the method 800, the BS may transmit DL signals 810 to the UE, for example, based on a timing reference of the BS (e.g., as shown by the DL transmit (Tx) timeline 802). The UE may receive the DL signals 810 after a propagation delay 830 as shown by the DL receive (Rx) timeline 804. The UE may transmit UL signals 820 to the BS, for example, based on a timing reference provided by the BS as shown by the UL Tx timeline 806.

To determine a schedule for the UE, the BS may estimate a round trip time (RTT) 832 between the BS and the UE, for example, based on a random access procedure. The propagation delay 830 may correspond to half of the RTT 832. The BS may transmit a timing advance (TA) command to the UE instructing the UE to transmit at an earlier time than an expected scheduled transmit time. The UE is expected to track the DL timing of the BS and adjust the UE's UL timing based the DL timing. For example, the BS may schedule the UE to transmit at a particular time according to the timeline 802. The UE may transmit at an earlier time than the scheduled transmit time based on the TA command so that the transmission can reach the BS at an arrival time according to the BS's timeline 802.

In addition, the BS may schedule the UE by providing a gap period for the UE to switch between transmit and receive. For example, the BS may schedule the UE to transmit a UL signal 820 sometime after a reception time of the DL signal 810 instead of immediately after a reception of the DL signal 810. As shown, there is a gap period 834 between the reception of a DL signal 810 and the transmission of a UL signal 820. While the method 800 is described in the context of a BS communicating with a UE over a wireless access link, the method 800 can be applied to a BS communicating with another BS over a wireless backhaul link, as described in greater detail herein.

FIG. 9 is a timing diagram illustrating a scheduling method 900 for an IAB network according to embodiments of the present disclosure. FIG. 9 illustrates communications between multiple components as represented by the vertical lines. The method 900 may be employed by a BS (e.g., the BSs 105) to communicate with a UE (e.g., the UEs 115) over a wireless access link (e.g., the wireless access links 125) or another BS over a wireless backhaul link (e.g., the wireless backhaul links 234) in an IAB network (e.g., the networks 200 and 300). The method 900 illustrates three nodes R1, R2, and R3 in three levels (e.g., the levels 402) for simplicity of discussion, but may be scaled to include any suitable number nodes (e.g., five, ten, twenty, or more than twenty) configured in any suitable number of levels (e.g., four, five, or more than five).

Nodes R1, R2, and R3 may correspond to a portion of the topology 400. For example, node R1 may be at a hop h1 (e.g., the levels 402) with respect to the anchor 410, where h1 is a positive integer. The method 900 may be used in conjunction with the method 500. For example, node R1 and the node R2 may correspond to BSs 105, and the node R3 may correspond to a BS 105 or a UE 115. The $DL_1$ Tx timeline 902, the $DL_1$ Rx timeline 904, and the $UL_1$ Tx timeline 906 between the node R1 and the node R2 are similar to the timeline 802, 804, and 806, respectively. In some scenarios, the node R1 may function as a parent node or an ACF-node to the node R2. The node R1 may transmit DL signals 910 according to a timing reference of the node RE The DL signals 910 may arrive at the node R2 after a propagation delay. The node R1 may transmit a TA command to the node R2. The node R2 may track the DL timing of the node R1, receive the TA command, and transmit UL signals 920 based on the TA command.

In some scenarios, nodes of FIG. 9 may communicate with each other based on scheduling (e.g., timing-based scheduling). For example, the node R2 can communicate with the node R3 (e.g., a child node or a UEF-node to the node R2). The node R2 can select a DL transmit timing reference (e.g., $DL_2$ Tx) for transmitting DL signals 930 to the node R3. FIG. 9 illustrates three options 932, 934, and 936 for the $DL_2$ Tx timeline 908.

In the first option 932, the node R2 may use a single transmit timing reference by aligning the DL transmit timing of the node R2 to the UL transmit timing of the node R2.

In the second option 934, the node R2 may use two transmit timing references, one for UL transmissions based on instructions from the node R1 and another one for DL transmissions. The node R2 may align the DL transmit timing of the node R2 to a DL transmit timing of a parent node or an ACF-node (e.g., the node R1) of the node R2.

In the third option 936, the node R2 may use two transmit timing references, one for UL transmissions based on instructions from the node R1 and another one for DL transmissions. The node R2 may align the DL transmit timing of the node R2 to the DL receive timing (e.g., a reception time of the DL signals 910) of the node R2.

The node R2 may select any one of the options 932, 934, and 936. However, the first option 932 and the third option 936 may lead to a large timing misalignment between nodes in the network depending on the number of hops (e.g., the levels 402) due to the accumulative effects of propagation delays (e.g., the delay 830) from one hop to the next. The second option 934 may provide the least amount timing misalignment since all DL transmit timing in the network may be aligned to the DL transmit timing of a top-level node (e.g., the anchor 410).

After selecting a timing reference for DL transmit, the node R2 may schedule UL and/or DL communications with the node R3. The node R2 may include a gap period in a schedule as required for the node R3 to switch between receive and transmit. The node R2 may further measure interference (e.g., cross-link interference) in the network, monitor transmissions (e.g., transmission error rates) in the network, and schedule the UL transmissions based on the measured interference (e.g., to minimize cross-link interference) and the monitored information (e.g., to minimize transmission error rates).

FIG. 10 is a timing diagram illustrating a scheduling method 1000 for an IAB network according to embodiments of the present disclosure. FIG. 10 illustrates communications between multiple components as represented by the vertical lines. The method 1000 may be employed by BSs (e.g., the BSs 105) to communicate with each other over wireless backhaul links (e.g., the wireless backhaul links 234) in an IAB network (e.g., the networks 200 and 300). The method 1000 illustrates a node R2 having two parent nodes R1 and R2 (e.g., in a mesh topology) for simplicity of discussion, but may be scaled to include any suitable number of parent nodes (e.g., three, four, five, or six). The nodes R1, R2, and R3 may correspond to the BSs 105. The nodes R1, R2, and R3 may correspond to a portion of the topology 400. For example, the node R1 may be at a hop h1 with respect to the anchor 410 and the node R2 may be at a hop h2 with respect to the anchor 410, where h1 and h2 are positive integers. The method 1000 may be used in conjunction with the method 500.

In the method 1000, the node R1 may transmit DL signals 1010 according to a timing reference of the node R1 as shown by the $DL_1$ Tx timeline 1001. The DL signals 1010 may arrive at the node R3 after a propagation delay as shown by the $DL_1$ Rx timeline 1003. The node R2 may transmit DL signals 1020 according to a timing reference of the node R2 as shown by the $DL_2$ Tx timeline 1002. The DL signals 1020 may arrive at the node R3 after a propagation delay as shown by the $DL_2$ Rx timeline 1005.

The node R3 may transmit UL signals 1030 based on a timing reference instructed by the node R1 (e.g., via a TA command) as shown by the $UL_1$ Tx timeline 1004. Similarly, the node R3 may transmit UL signals 1040 based on a timing reference instructed by the node R2 (e.g., via a TA command) as shown by the $UL_2$ Tx timeline 1006.

When the node R3 employs the second option 934 described in the method 900 with respect to FIG. 9, the node R3 may align the DL transmit timing of the node R3 to an average timing of the parent nodes R1 and R2. When employing the second option 934, the maximum gap period required may correspond to a maximum RTT in the network, for example, a maximum RTT 1050 from the parent nodes R1 and R2 to the node R3 as shown.

After aligning or selecting a timing reference, the node R3 may determine gap periods for scheduling communications with child nodes or UEF-nodes of the node R3 as a function of the timing reference, as described in greater detail herein.

As shown in the methods 800, 900, and 1000, the present disclosure provides techniques for timing alignment across multi-hop IAB networks. In an example, DL transmission timing is aligned across IAB nodes (e.g., the BSs 105 and the relay nodes 1310) and IAB donors (e.g., the anchor 410, the BSs 105, and the relay nodes 1310)) as shown by the option 934. In an example, DL and UL transmission timing is aligned within an IAB-node as shown by the option 932.

Figure 11:
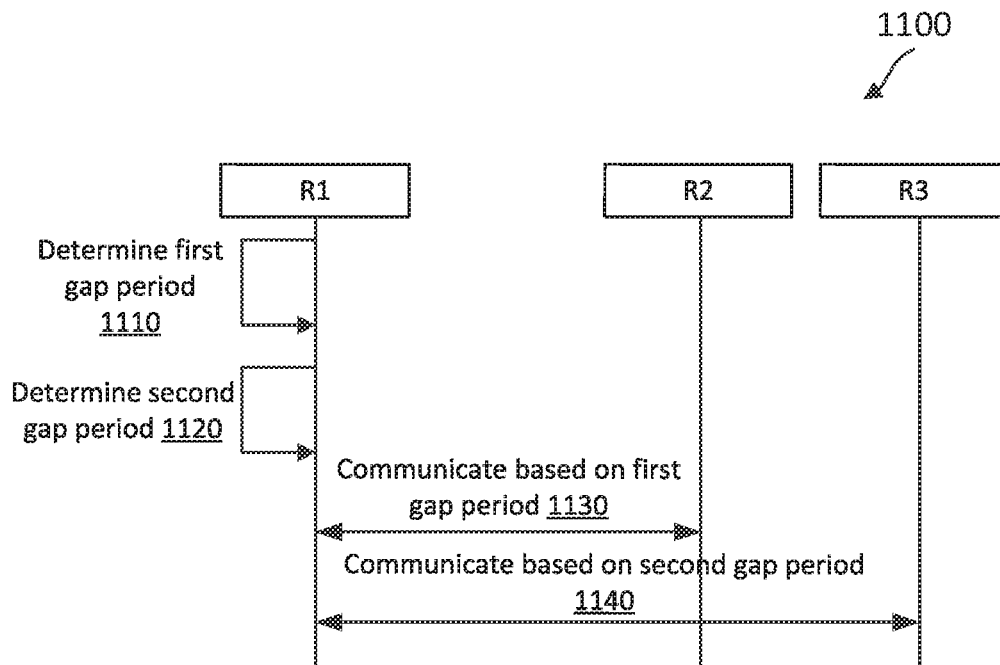
FIG. 11 is a signaling diagraming illustrating an IAB communication method according to embodiments of the present disclosure.

FIG. 11 is a signaling diagraming illustrating an IAB communication method 1100 according to embodiments of the present disclosure. The method 1100 is implemented among relay nodes R1, R2, and R3. The node R1 may correspond to a BS (e.g., the BSs 105 and 700 and the anchor 410) and may function as an ACF-node to the nodes R2 and R3. The nodes R2 and R3 may correspond to BSs and/or UEs (e.g., the UEs 115 and 600) and may function as UEF-nodes to the node RE Steps of the method 1100 can be executed by computing devices (e.g., a processor, processing circuit, and/or other suitable component) of the relay nodes. As illustrated, the method 1100 includes a number of enumerated steps, but embodiments of the method 1100 may include additional steps before, after, and in between the enumerated steps. In some embodiments, one or more of the enumerated steps may be omitted or performed in a different order. Use of the label "step" is to describe an action or activity as opposed to setting a prescribed or required order of events.

At step 1110, the node R1 determines a first gap period (e.g., the period 834) for communicating with the node R2. For example, the node R1 may receive a report from the node R2. The reports may include capability information, a transmit-receive switching requirement, a synchronization reference switching requirement, or scheduling information of the node R2. The capability information may include a UE-category or a power class of the node R2 and/or frequency bands, radio access technologies (RATs), measurement and reporting supported by the node R2, and/or features supported by the node R2. The transmit-receive switching requirement refers to the amount of time required for the node R2 to switch from a transmit mode to a receive mode or from a receive mode to a transmit mode. The synchronization reference switching requirement refers to the amount of time for the node R2 to switching between two or more synchronization references. The node R1 may determine the first gap period based on the report.

At step 1120, the node R1 determines a second gap period (e.g., the period 834) for communicating with the node R3, for example, based on a transmit-receive switching of the node R3.

At step 1130, the node R1 communicates with the node R2 based on the first gap period. For example, the node R1 may determine a DL transmission time for transmitting to the node R2 and/or a UL transmission time for the node R2 based on the first gap period.

At step 1140, the node R1 communicates with the node R3 based on the second gap period. For example, the node R1 may determine a DL transmission time for transmitting to the node R3 and/or a UL transmission time for the node R3 based on the second gap period.

In some embodiments, the first gap period and the second gap period can be indicated in downlink control information (DCI) along with scheduling information. For example, in the context of LTE or NR, the node R1 may transmit a physical downlink control channel (PDCCH) signal indicating a schedule for communicating a signal with the node R2. The PDCCH signal may include a DCI indicating a gap period. Alternatively, gap periods can be indicated in other DCI, media access control (MAC) control element (CEs), MIBs, SIBs, and/or a RRC messages.

As can be seen, in the method 1100, an ACF-node or a parent node (e.g., the node R1) may determine a UEF-specific gap period for communicating with a UEF-node or a child node (e.g., the nodes R2 and R3).

Figure 12:
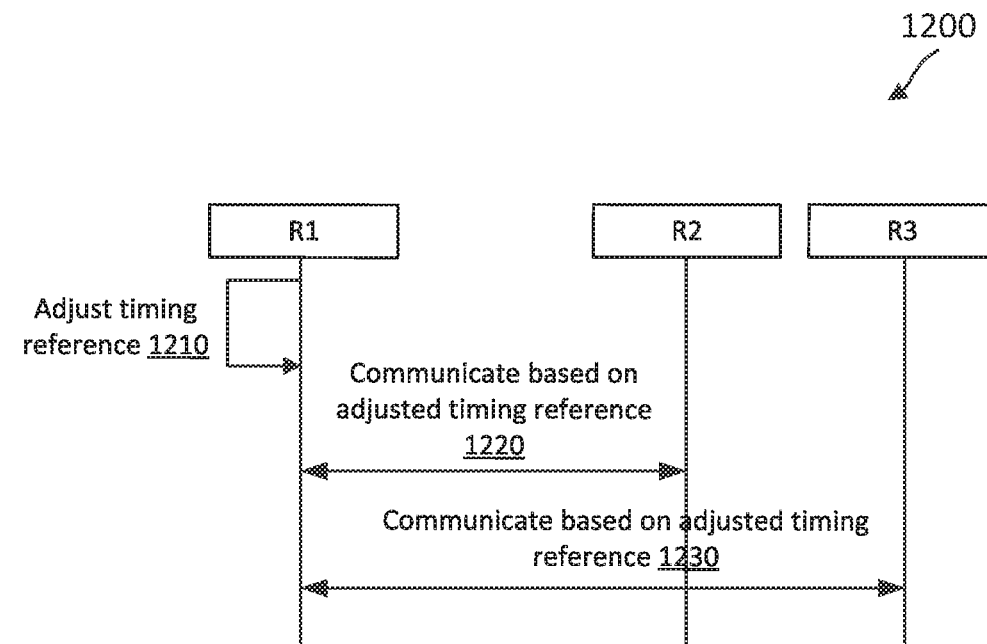
FIG. 12 is a signaling diagraming illustrating an IAB communication method according to embodiments of the present disclosure.

FIG. 12 is a signaling diagraming illustrating an IAB communication method 1200 according to embodiments of the present disclosure. The method 1200 is implemented among relay nodes R1, R2, and R3. The node R1 may correspond to a BS (e.g., the BSs 105 and 700 and the anchor 410) and may function as an ACF-node to the nodes R2 and R3. The nodes R2 and R3 may correspond to BSs and/or UEs (e.g., the UEs 115 and 600) and may function as UEF-nodes to the node RE Steps of the method 1200 can be executed by computing devices (e.g., a processor, processing circuit, and/or other suitable component) of the relay nodes. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

The method 1200 may improve resource utilization efficiency compared to the method 1100. For example, gap periods can be wasteful in terms of resource utilization since gap periods are idle periods with no transmission. When a parent node (e.g., the node R1) determines that all of its child nodes (e.g., the nodes R2 and R3) require a certain gap period, the parent node may adjust (e.g., advance or delay) a timing reference of the parent node. In other words, the parent node may adjust a frame boundary or a slot boundary for communicating with the child nodes.

Alternatively, when the parent node determines that multiple gap periods in a slot for communicating with the child nodes, the parent node may switch from a normal cyclic prefix (CP) mode to an extended CP (ECP) mode. CP refers to the prefixing of a symbol with a repetition of an end of the symbol. CP is used in OFDM symbols to mitigate intersymbol interference (ISI). An ECP refers to a CP with an extended time duration compared to a normal CP.

At step 1210, the node R1 adjusts the node R1's timing reference. For example, the node R1 may determine the adjustment such that the adjustment may not cause interference to other relay nodes in the network or create scheduling conflicts with other relay nodes. The adjustment may be a delaying of and advancing of the timing reference or an inclusion of an ECP.

At step 1220, the node R1 communicates with the node R2 based on the adjusted timing reference.

At step 1230, the node R1 communicates with the node R3 based on the adjusted timing reference.

Accordingly, the present disclosure provides techniques for alignments between IAB nodes and/or IAB donors or within an IAB node based on a slot-level-alignment or a symbol-level-alignment.

FIGS. 13-16 illustrate various mechanisms for maintaining and/or refining synchronization in an IAB network (e.g., the networks 200 and 300), for example, based on a timing reference of an anchor (e.g., the anchor 410), a relay node (e.g., the BSs 105 and the UEs 115) with a GPS connection, a selected relay node, and/or a central entity.

Figure 13:
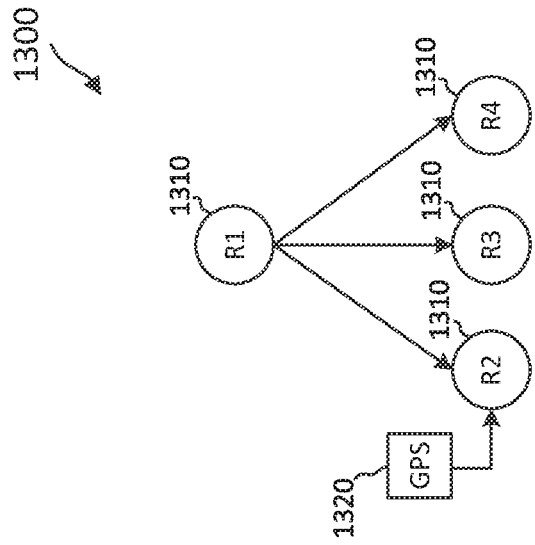
FIG. 13 illustrates a distributed synchronization method according to embodiments of the present disclosure.

FIG. 13 illustrates a distributed synchronization method 1300 according to embodiments of the present disclosure. The method 1300 may be employed by BSs (e.g., the BSs 105) and UEs (e.g., the UEs 115) in an IAB network (e.g., the network 100). The method 1300 illustrates four relay nodes 1310 with one relay node including a GPS 1320 for simplicity of discussion, but may be scaled to include any suitable number of relay nodes (e.g., five, six, ten, or more than ten) and/or GPS connections (e.g., three, four, five, or six).

In the method 1300, the node R1 1310 may correspond to a BS and the nodes R2, R3, and R4 1310 can be a BS or a UE. In an embodiment, the node R1 1310 may be an anchor (e.g., the anchor 410) in the network. Each of the nodes 1310 may maintain one or more synchronization references and may communicate synchronization information (e.g., timing information and/or frequency information) with each other. Each node 1310 may adjust the node 1310's synchronization references based on synchronization information received from other nodes.

The nodes 1310 may exchange synchronization information related to internal timing references with each other. In addition, the node R2 1310 may transmit synchronization information based on a timing provided by the GPS 1320 to the node R1 1310. The nodes 1310 may receive synchronization information from one or more sources (e.g., other nodes 1310 and/or the GPS 1320) and may adjust an internal timing reference based on the received synchronization information.

Figure 14:
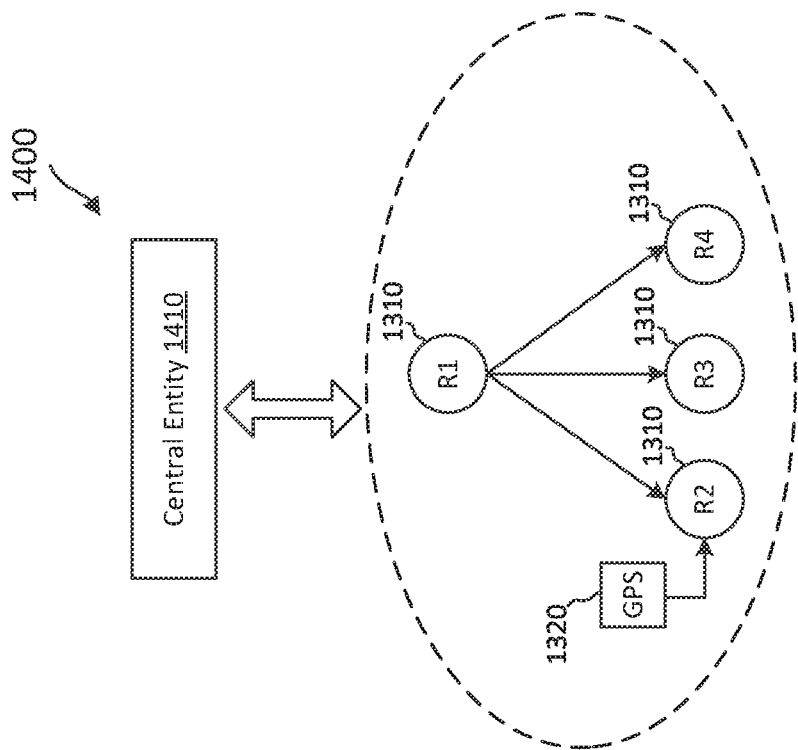
FIG. 14 illustrates a centralized synchronization method transmission method according to embodiments of the present disclosure.

FIG. 14 illustrates a centralized synchronization method 1400 according to embodiments of the present disclosure. The method 1400 may be employed by BSs (e.g., the BSs 105) and UEs (e.g., the UEs 115) in an IAB network (e.g., the network 100). The method 1400 is substantially similar to the method 1300, but employs a central entity 1410 to determine adjustments for synchronization references of the nodes 1310. The central entity 1410 may be a logical entity and may be physically mapped to any node in a network, for example, an anchoring node, a relay node 1310, or a dedicated node.

In the method 1400, the central entity 1410 may collect synchronization information from the nodes 1310. The central entity 1410 may determine synchronization adjustments for the nodes 1310 based on the collected synchronization information. The central entity 1410 may transmit the determined synchronization adjustments to corresponding nodes 1310.

Figure 15:
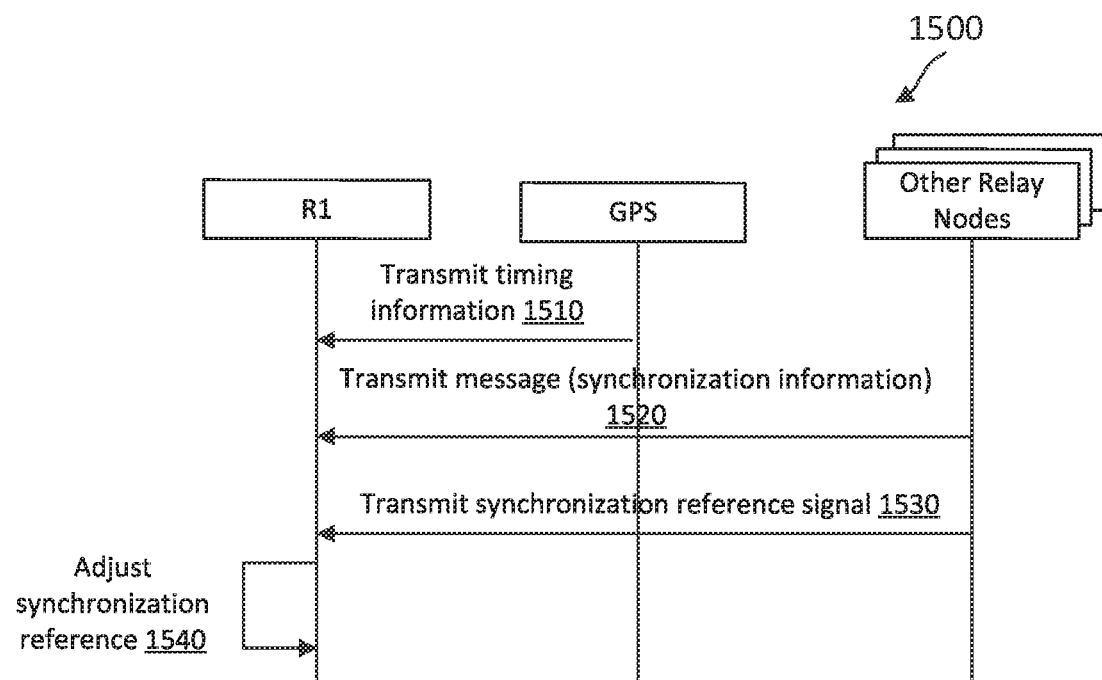
FIG. 15 is a signaling diagraming illustrating a distributed synchronization method according to embodiments of the present disclosure.

FIG. 15 is a signaling diagraming illustrating a distributed synchronization method 1500 according to embodiments of the present disclosure. The method 1500 is implemented between a relay node R1 (e.g. the BSs 105 and the UEs 115 and the nodes 1310) and other relay nodes (e.g. the BSs 105 and the UEs 115 and the nodes 1310) in an IAB network (e.g., the network 100). The node R1 may be coupled to a GPS (e.g., the GPS 1320). The other relay nodes may include a combination of UEF-nodes of the node R1 and ACF-nodes of the node R1. The method 1500 may employ similar mechanisms as described in the method 1300 with respect to FIG. 13. Steps of the method 1500 can be executed by computing devices (e.g., a processor, processing circuit, and/or other suitable component) of the relay nodes. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the GPS transmits timing information to the node R1.

At step 1520, one or more other relay nodes may transmit messages to the node R1. Each message may include synchronization information associated with a synchronization reference (e.g., a GPS 1320 or an internal synchronization reference) of a corresponding relay node. The synchronization information can include timing information or frequency information. The message may indicate an amount of timing adjustment and/or an amount of frequency adjustment for the node RE In some embodiments, the messages are LTE or NR MAC CEs.

At step 1530, one or more other relay nodes may transmit synchronization reference signals, for example, based on synchronization references at corresponding relay nodes. The synchronization reference signals may be layer 1 (L1) (e.g., physical layer) signals including a predetermined signal sequence. In some embodiments, the synchronization reference signals may be carried in NR synchronization signal (SS) blocks.

In an embodiment, the synchronization reference signals and/or the messages may be transmitted based on a semi-static schedule. In an embodiment, the synchronization reference signals and/or the messages may be transmitted in response to a request from the node R1.

At step 1540, the node R1 may adjust synchronization references of the node R1 based on the timing information received from the GPS, the synchronization information in the received messages, and/or measurements (e.g., timing and/or frequency measurements) of the received synchronization reference signals.

In an embodiment, the node R1 may adjust the synchronization references of the node R1 upon detecting a difference between the synchronization references of the node R1 and the received synchronization reference signals exceeding a threshold.

In some embodiments, there can be a priority level associated with each source of the synchronization information. The information about the priority level may be included in each corresponding synchronization message indicating a source of the synchronization information, for example, whether the synchronization information is based on a GPS or an internal synchronization reference. Additionally or alternatively, the information about the priority level may be indicated through other messages, by other nodes in the system, or acquired from upper layer. In some embodiments, each message can include a priority level indicating a hop count or level (e.g., the level 402) at which a corresponding node is located. Thus, a node (e.g., the node R1) receiving the synchronization information may adjust the node's internal synchronization reference as a function of the priority levels. For example, the node may adjust an internal synchronization reference based on an average determined from the highest priority synchronization information.

Figure 16:
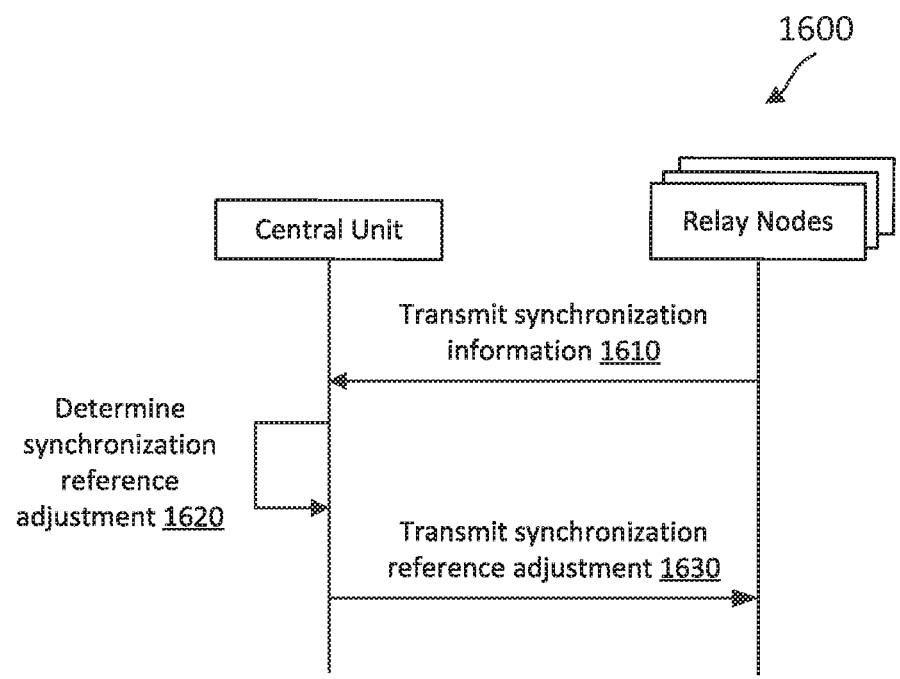
FIG. 16 is a signaling diagraming illustrating a centralized synchronization method according to embodiments of the present disclosure.

FIG. 16 is a signaling diagraming illustrating a centralized synchronization method 1600 according to embodiments of the present disclosure. The method 1600 is implemented between a central entity (e.g., the central entity 1410) and relay nodes (e.g. the BSs 105 and the UEs 115) in an IAB network (e.g., the network 100). The method 1600 may employ similar mechanisms as described in the method 1400 with respect to FIG. 14. Steps of the method 1600 can be executed by computing devices (e.g., a processor, processing circuit, and/or other suitable component) of the relay nodes. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the relay nodes may transmit synchronization information to the central entity. The synchronization information may correspond to timing and/or frequency information of a synchronization reference (e.g., a GPS 1320 or an internal synchronization reference) of a corresponding relay node.

At step 1620, the central entity may determine adjustments for synchronization references of the relay nodes based on the received synchronization information.

At step 1630, the central entity may transmit the determined synchronization adjustments to corresponding relay nodes. For example, the central entity may instruct a first relay node to communicate with a second relay node using a particular adjustment. In some embodiments, the adjustments may include gap periods, transmit timing adjustments, receive timing adjustments, synchronization timing adjustments, and/or synchronization frequency adjustments. In some embodiments, the central entity may further receive reports from the relay nodes. The reports may include capability information, scheduling information, transmit-receive switching requirements, synchronization reference switching requirements associated with the relay nodes. The central entity may determine the gap periods and/or cyclic prefix configurations (e.g., normal CP or ECP) based on the reports. In some embodiments, the synchronization information and the adjustments may be carried in NR or LTE RRC messages.

Figure 17:
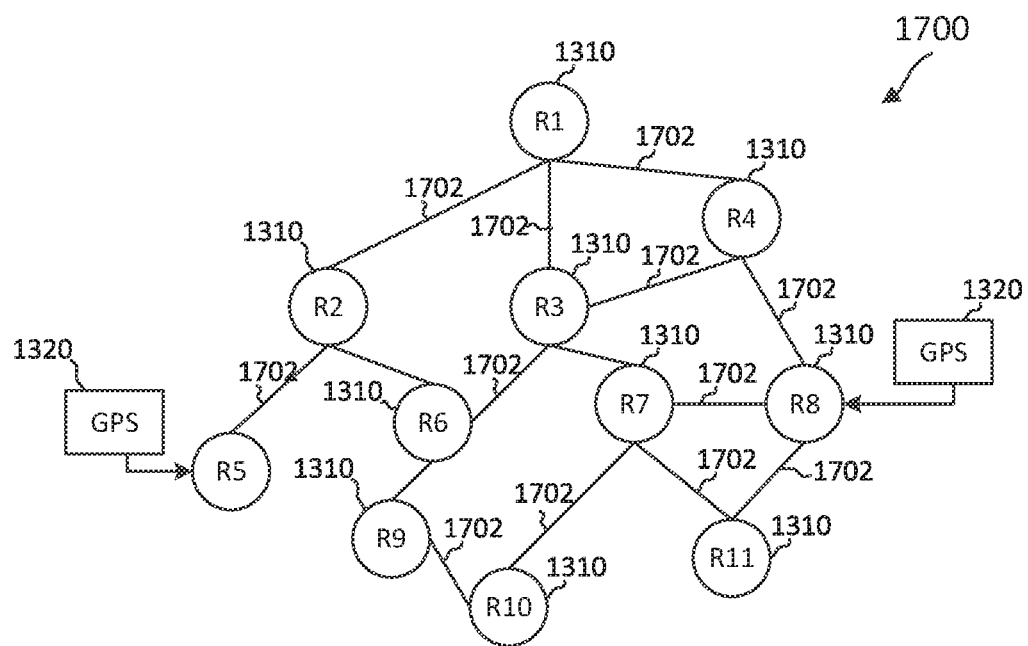
FIG. 17 illustrates a wireless backhaul network according to embodiments of the present disclosure.

FIG. 17 illustrates a wireless backhaul network 1700 according to embodiments of the present disclosure. The network 1700 may be similar to the networks 200 and 300. The network 1700 includes a plurality of relay nodes 1310 shown as R1 to R11. Some of the nodes 1310 (e.g., R5 and R8) may include connections to GPSs 1320. The network 1700 may employ the topology 400 to establish multi-hop relay links 1702. The node R1 1310 may be an anchoring node (e.g., the anchor 410) in communication with a core network (e.g., the network 130) via an optical fiber link (e.g., the optical fiber link 134). The node R1 1310 may function as an intermediary to relay backhaul traffic between the core network and the other nodes 1310.

Figure 18:
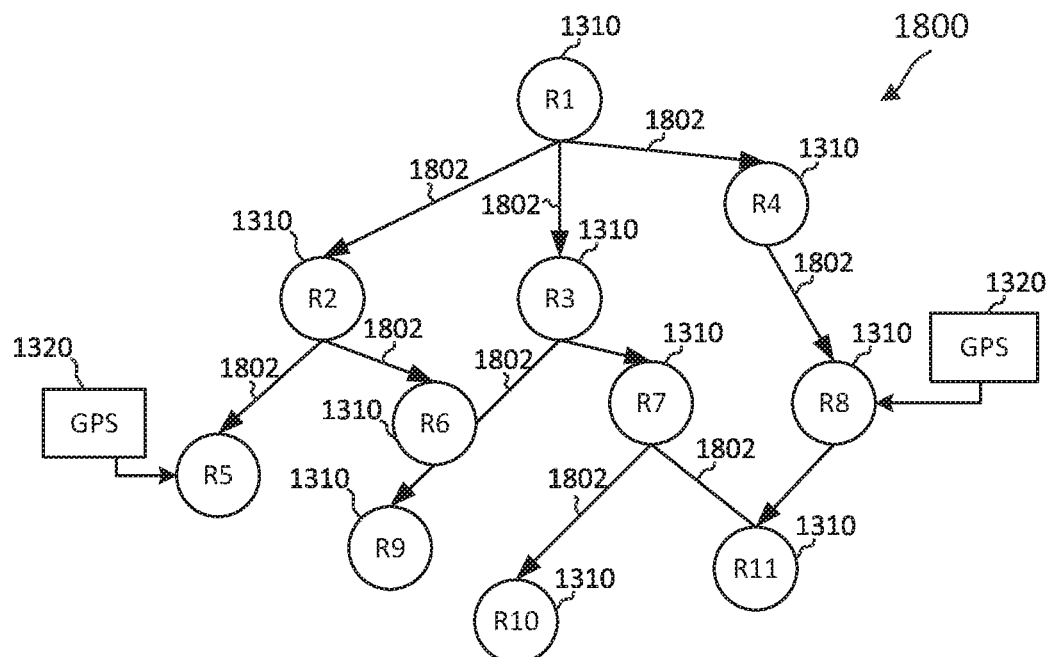
FIG. 18 illustrates a traffic routing overlay in a wireless backhaul network according to embodiments of the present disclosure.

FIG. 18 illustrates a traffic routing overlay 1800 over the wireless backhaul network 1700 according to embodiments of the present disclosure. The traffic routing overlay 1800 includes traffic routes 1802 established among the nodes 1310 for routing traffic in the network 1700. The traffic routes 1802 may or may not be overlaid on top of all the links 1702. For example, while the node R7 1310 and the node R8 1310 can be connected by a link 1702, the traffic routing overlay 1800 does not include a traffic route 1802 between the node R7 1310 and the node R8 1310. The traffic routing overlay 1800 may partition and allocate resources for the traffic routes 1802 (e.g., overlaid over the links 1702) to transport traffic among the nodes 1310, for example, using the method 500. The traffic routing overlay 1800 can include various network control and/or management operations such as keep alive and link maintenance operations.

Figure 19:
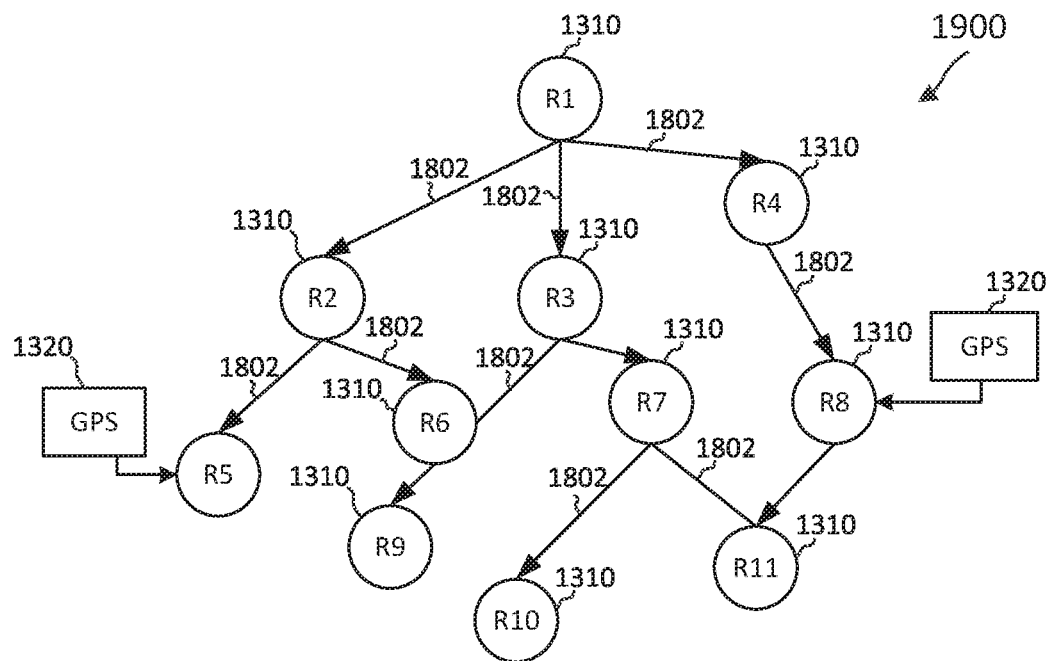
FIG. 19 illustrates a synchronization overlay in a wireless backhaul network according to embodiments of the present disclosure.

FIG. 19 illustrates a synchronization overlay 1900 over the wireless backhaul network 1700 according to embodiments of the present disclosure. The synchronization overlay 1900 is based on the traffic routing overlay 1800. The synchronization overlay 1900 reuses the traffic routes 1802 established by the traffic routing overlay 1800 and resources allocated by the traffic routing overlay 1800 to transport synchronization information and/or adjustment instructions in the among the nodes 1310. The synchronization overlay 1900 can support on-demand exchange of synchronization information and/or adjustments. The synchronization overlay 1900 can also leverage network controls (e.g., keep alive and link maintenance protocols) supported by the traffic routing overlay 1800.

Figure 20:
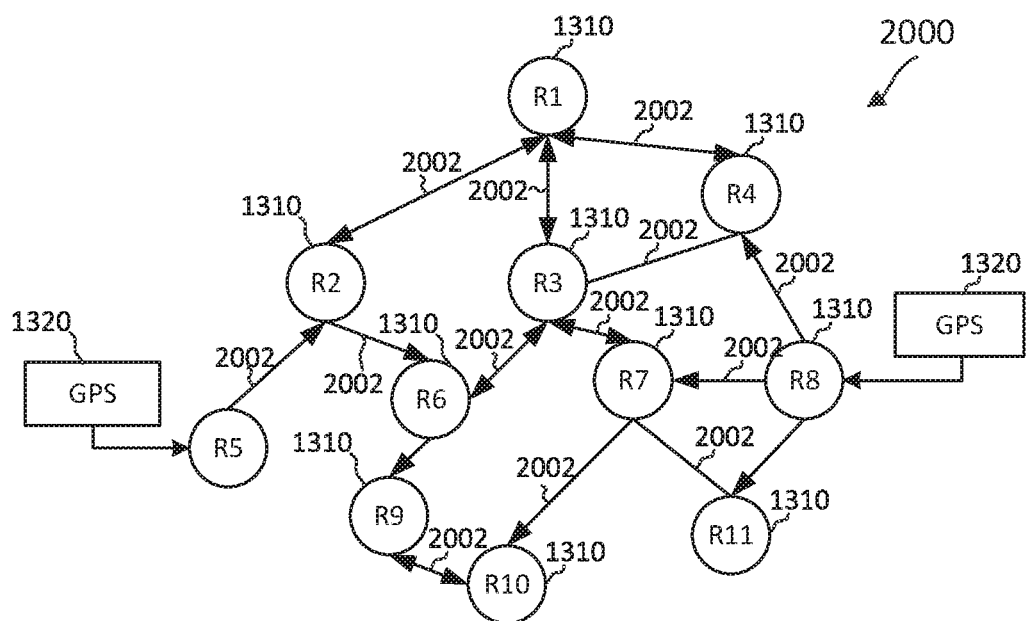
FIG. 20 illustrates a synchronization overlay in a wireless backhaul network according to embodiments of the present disclosure.

FIG. 20 illustrates a synchronization overlay 2000 over the wireless backhaul network 1700 according to embodiments of the present disclosure. Instead of reusing the traffic routing overlay 1800 as in the overlay 1900, the overlay 2000 may establish routes 2002 over the links 1702. The routes 2002 may be different from the traffic routes 1802. For example, the overlay 2000 may establish the routes 2002 based on synchronization sources (e.g., the GPSs 1320) available in the network 1700. Thus, the overlay 2000 may provide better utilization of synchronization sources, but may be required to allocate resources, determine schedules, and/or other network controls separate from the overlay 1800.

When a network (e.g., the networks 200 and 300) employs the overlay 1900 (e.g., reusing the traffic overlay 1800), UEF-nodes in the network can provide synchronization feedbacks to corresponding ACF-nodes, for example, via MAC CEs. ACF-nodes in the network may receive the feedbacks from corresponding UEF-nodes and adjusts synchronization references based on the feedbacks.

When a network employs the overlays 1900 or 2000, relay nodes in the network can send physical reference signals (e.g., in synchronization signal blocks (SSBs)). Other relay nodes in the network may receive the physical reference signals and may adjust corresponding synchronization references based on measurements of the received physical reference signals, for example, for frequency tracking.

Figure 21:
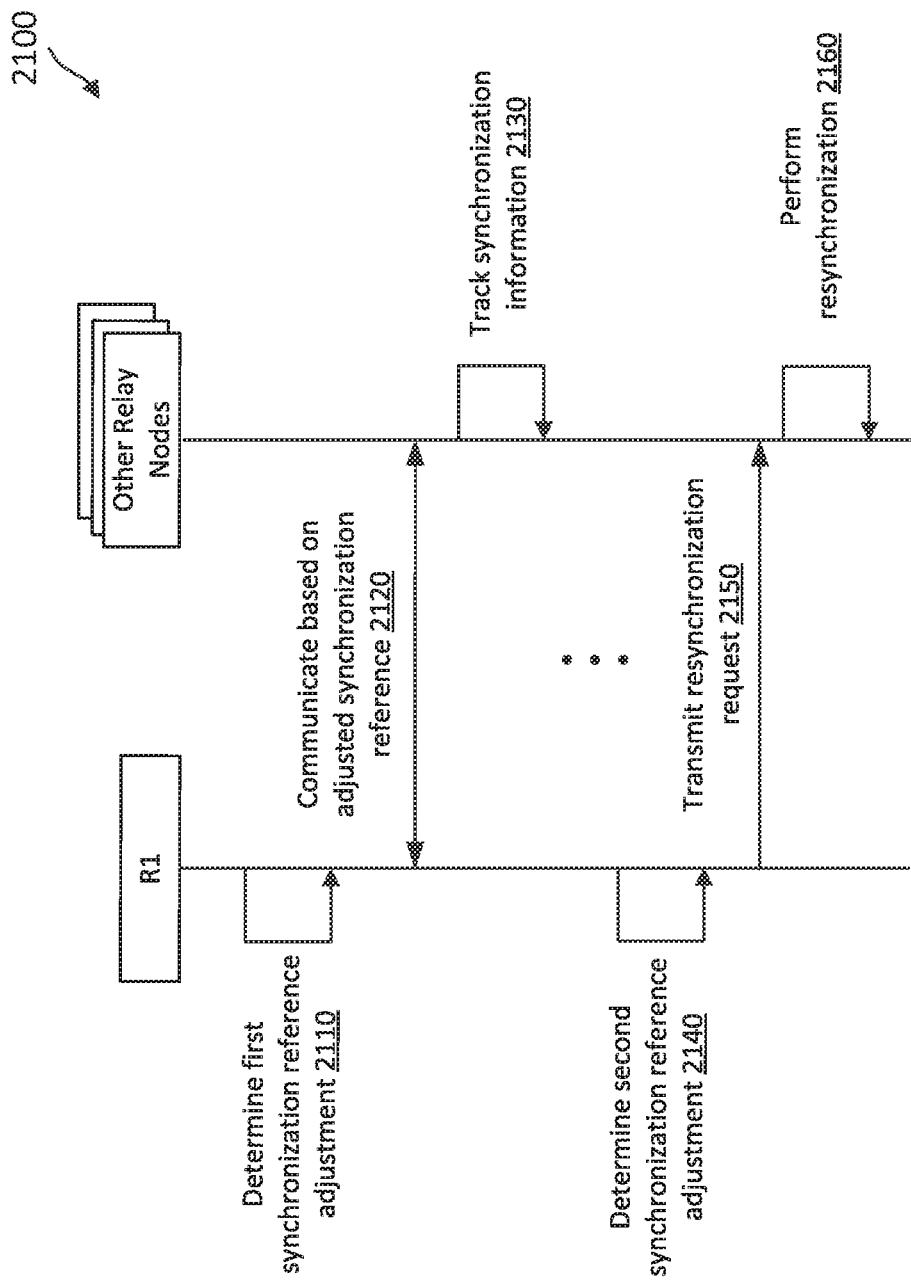
FIG. 21 is a signaling diagram illustrating an IAB communication method according to embodiments of the present disclosure.

FIG. 21 is a signaling diagraming illustrating a synchronization method 2100 according to embodiments of the present disclosure. The method 2100 is implemented between a relay node R1 (e.g. the nodes 1310 and the BSs 105 and 700) and other relay nodes (e.g. the nodes 1310, the BSs 105 and 700, and the UEs 115 and 600) in an IAB network (e.g., the network 100). The other relay nodes may be UEF-nodes or child nodes of the node R1. The node R1 and the other relay nodes may be part of the overlay 1900 or 2000. Steps of the method 2100 can be executed by computing devices (e.g., a processor, processing circuit, and/or other suitable component) of the relay nodes. As illustrated, the method 2100 includes a number of enumerated steps, but embodiments of the method 2100 may include additional steps before, after, and in between the enumerated steps. In some embodiments, one or more of the enumerated steps may be omitted or performed in a different order.

At step 2110, the node R1 determines a first synchronization reference adjustment for one or more internal synchronization references of the node R1. The first adjustment may be relatively small, for example, a few samples or less than a symbol time period. The node R1 may adjust the internal synchronization references and continue to communicate with the other relay nodes.

At step 2120, the node R1 communicates with the other relay nodes based on the adjusted synchronization references.

At step 2130, the other relay nodes may track the adjustment based on the communications with the node R1. For example, a relay node may receive a communication or synchronization signal from the node R1 and may detect the adjustment from the received communication signal. Thus, the relay node may adjust an internal synchronization reference of the node based on the detected adjustment.

At step 2140, after a period of time, the node R1 determines a second synchronization reference adjustment for the internal synchronization references. The second adjustment may be relatively large, for example, greater than a symbol time period. The node R1 may determine that a resynchronization is required from the other relay nodes.

At step 2150, the node R1 transmits a resynchronization request to the other relay nodes. The node R1 may transmit the resynchronization request in a broadcast mode. The node R1 may additionally indicate resource and/or configuration information (e.g., a set of synchronization reference signals or synchronization pulses) that the other relay nodes may use for the resynchronization. In some embodiments, the node R1 may further indicate a resynchronization configuration, for example, including an amount of the adjustment and/or when the adjustment becomes effective (e.g., an offset time period or a number of slots with respect to a transmission time of the request).

At step 2160, upon receiving the resynchronization request, the other relay nodes may perform resynchronization based on the request. For example, a relay node may receive synchronization reference signals based on the resources and/or configuration indicated in the request and may adjust corresponding internal synchronization references at a start time corresponding to the offset time period or slot number indicated in the request. While the method 2100 is described in the context of time synchronization and adjustment, the method 2100 can be applied to perform frequency synchronization and adjustment.

Figure 22:
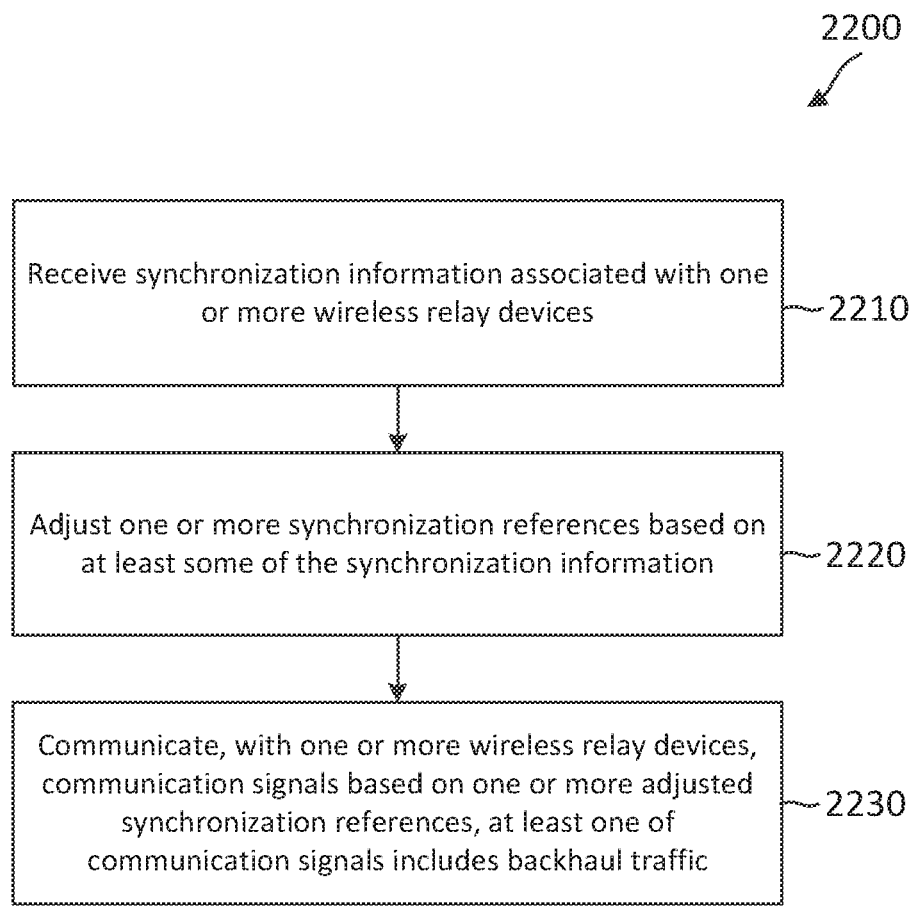
FIG. 22 is a flow diagram of a method for communicating in an IAB network according to embodiments of the present disclosure.

FIG. 22 is a flow diagram of a method 2200 for communicating in an IAB network according to embodiments of the present disclosure. The network may be similar to the networks 200, 300, and 1700 and may be configured with the topology 400 and/or the overlays 1800, 1900, and 2000. Steps of the method 2200 can be executed by a computing device (e.g., a processor, processing circuit, and/or other suitable component) of a wireless communication device, such as the BSs 105 and 700 and the UEs 115 and 600. The method 2200 may employ similar mechanisms as in the methods 500, 800, 900, 1000, 1100, 1200, 1300, 1400, 1500, 1600, and 2100 described with respect to FIGS. 5, 8, 9, 10, 11, 12, 13, 14, 15, 16, and 21, respectively. As illustrated, the method 2200 includes a number of enumerated steps, but embodiments of the method 2200 may include additional steps before, after, and in between the enumerated steps. In some embodiments, one or more of the enumerated steps may be omitted or performed in a different order.

At step 2210, the method 2200 includes receiving, by a first wireless communication device, synchronization information from one or more wireless relay devices. The first wireless communication device and the one or more wireless relay devices may correspond to the relay nodes 1310.

At step 2220, the method 2200 includes adjusting, by the first wireless communication device, one or more synchronization references based on at least some of the synchronization information.

At step 2230, the method 2200 includes communicating, by the first wireless communication device with the one or more wireless relay devices, communication signals based on the one or more adjusted synchronization references. The communication signals can include a combination of backhaul traffic and access traffic.

In an embodiment, the first wireless communication device may be a BS and the one or more wireless relay devices can include parent nodes (e.g., ACF-nodes) and/or child nodes (e.g., UEF-nodes) of the first wireless communication devices. For example, the one or more wireless relay devices may include a combination of UEs (e.g., child nodes) and other BSs (e.g., child nodes and/or parent nodes). The UEs may be served by the BS over wireless access links (e.g., the wireless access links 125). The BS may relay backhaul traffic for other BSs over wireless backhaul links (e.g., the wireless backhaul links 234).

In an embodiment, the first wireless communication device may receive the synchronization information by receiving, from a first wireless relay device of the one or more wireless relay devices, a message including at least one of timing information associated with a synchronization reference of the first wireless relay device, frequency information associated with the synchronization reference of the first wireless relay device, capability information of the first wireless relay device, scheduling information of the first wireless relay device, a transmit-receive switching requirement of the first wireless relay device, or a synchronization reference switching requirement of the first wireless relay device.

In an embodiment, the first wireless communication device may receive the synchronization information by receiving, from a first wireless relay device of the one or more wireless relay devices, a synchronization reference signal that is based on a synchronization reference of the first wireless relay device. The first wireless communication device can determine frequency offset and/or timing offset based on measurements of the received synchronization reference signals.

In an embodiment, the synchronization information may include priority level information. The priority level information may include the source of the synchronization information, for example, whether the synchronization information is obtained from a GPS or an internal synchronization reference of a corresponding relay node. The priority level information may also include a hop count indicating the number of hops (e.g., the levels 402) with respect to original sources of corresponding synchronization references. Thus, the first wireless communication device can adjust the one or more synchronization references as a function of the priority levels.

In an embodiment, the first wireless communication device may receive the synchronization information from a central entity (e.g., the central entity 1410). In an embodiment, the first wireless communication device may further receive at least one of timing information or frequency information from an external synchronization source and may adjust the one or more synchronization references further based on the at least one of timing information or frequency information. The external synchronization source may be a GPS (e.g., the GPS 1320) or a synchronization source provided by another radio access technology (RAT). In some embodiments, the first wireless communication device may request for the synchronization information. In some other embodiments, the first wireless communication device may receive the synchronization information based on a semi-static schedule. In an embodiment, the first communication device may transmit synchronization information associated with the one or more synchronization references based on at least one of a schedule, a synchronization information request, a measurement of the one or more synchronization references, or the adjusting of the one or more synchronization references.

In an embodiment, the first wireless communication device may relay backhaul traffic of the one or more wireless relay devices to an anchoring wireless communication device (e.g., the anchor 410) in communication with a core network (e.g., the core network 130) via an optical fiber link (e.g., the optical fiber link 134). The first wireless communication device may communicate with the one or more wireless relay devices based on a DL transmit timing of the anchoring wireless communication device, for example, using the second option 934 shown in the method 900.

In an embodiment, the first wireless communication device may communicate with the one or more wireless relay devices using UEF-specific gap period (e.g., the gap period 834) based on each wireless relay device's capability (e.g., transmit-receive switching time). For example, the first wireless communication device may determine a first gap period based on a capability parameter of a first wireless relay device of the one or more wireless relay devices. The first wireless communication device may determine a second gap period based on a capability parameter of a second wireless relay device of the one or more wireless relay devices, the second gap period different from the first gap period. The first wireless communication device may communicate with the first wireless relay device and the second wireless relay device based on the first gap period and the second gap period, respectively.

In an embodiment, the first wireless communication device can determine a gap period based on measurements and indication received from parent nodes (e.g., ACF-nodes) and/or child nodes (e.g., the UEF-nodes) of the first wireless communication device. In an embodiment, the first wireless communication device can determine a gap period based on schedules of the first wireless communication device or schedules of other relay nodes. In an embodiment, the first wireless communication device can determine a gap period based on commands received from a central entity.

In some embodiments, a gap period can be located at any position within a slot, for example, at the beginning of a slot, at the end of a slot, or in the middle of the slot. The gap period can be network-wide, cell-specific, and/or UEF-specific. In some embodiments, a gap period may change from slot to slot. In some embodiments, a gap period can be semi-statically configured with a semi-persistent pattern.

In an embodiment, the first wireless communication device may simultaneously communicate with a first wireless relay device and a second wireless relay device of the one or more wireless relay devices. The first wireless communication may communicate with the first wireless relay device using a first synchronization reference and may communicate with the second wireless relay device using a second synchronization reference that is different from the first synchronization reference.

In an embodiment, the first wireless communication device may switch from a normal CP to an ECP during the communication based on capability parameters of the one or more wireless relay devices. When the first wireless communication device multiplexes communication with multiple relay devices, there may be a need to extend the duration of a CP (e.g., to an ECP) to accommodate the different timings of the multiple relay devices in order to avoid ISI.

In an embodiment, the first wireless communication device may use different antenna sub-arrays and different digital chains when communicating simultaneously with multiple wireless relay devices. In such an embodiment, the first wireless communication device may not be required to switch to an ECP mode. In another embodiment, the first wireless communication device may use different antenna sub-arrays with a single digital chain or a single antenna sub-array with multi-finger beamforming. In such an embodiment, the first wireless communication device may be required to switch to an ECP mode and multiplex the communications, for exampl, using frequency-division multiplexing (FUM).

In an embodiment, the first wireless communication device may communicate with a first wireless relay device of the one or more wireless relay devices, a first communication signal of the communication signals during a first time period based on a first synchronization reference of the one or more synchronization references. The first wireless communication device may communicate with a second wireless relay device of the one or more wireless relay devices, a second communication signal of the communication signals during a second time period subsequent to the first time period based on a second synchronization reference of the one or more synchronization references that is different than the first synchronization reference. For example, the first wireless communication device may transmit and/or receive a reference signal (e.g., a CSI-RS), a control signal, and/or a data signal by sweeping transmit and/or receive beams towards different directions over consecutive time periods. In some embodiments, common resources may be allocated to multiple relay devices for transmitting synchronization signals or beam references signals. Since different relay devices can have different propagation delays, the use of ECP may be beneficial to accommodate the different delays.

While a schedule may accommodate timing misalignment among different nodes and/or avoid ISI by introducing gap periods or using an ECP mode, there is a tradeoff between the use of ECP and gap periods. The use of ECP increases overheads in all symbols within a slot. However, when a schedule requires multiple gap periods within a slot, the use of ECP may be suitable. Conversely, when a schedule does not require multiple switching between different synchronization references, the use of gap periods may be suitable. For example, a relay node may sweep multiple directions towards one node based on a first synchronization reference and then sweep multiple directions towards another node based on a second synchronization reference. In such a scenario, the relay node may require a single gap period between the two sweeps, which may be more efficient than using an ECP for all symbols.

In an embodiment, the first wireless communication device can determine whether to select a normal CP or an ECP based on measurements and indication received from parent nodes (e.g., ACF-nodes) and/or child nodes (e.g., the UEF-nodes) of the first wireless communication device, schedules of the first wireless communication device, schedules of other relay nodes, and/or commands received from a central entity.

Figure 23:
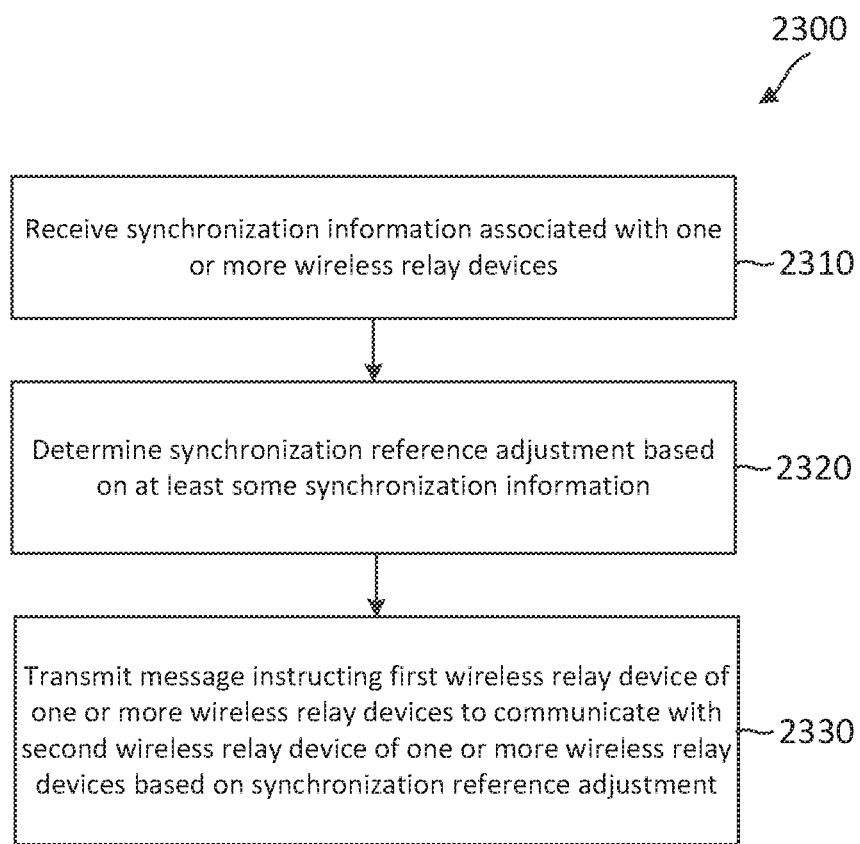
FIG. 23 is a flow diagram of a method for managing synchronization references in an IAB network according to embodiments of the present disclosure.

FIG. 23 is a flow diagram of a method 2300 for managing synchronization references in an IAB network according to embodiments of the present disclosure. The network may be similar to the networks 200, 300, and 1700 and may be configured with the topology 400 and/or the overlays 1800, 1900, and 2000. Steps of the method 2300 can be executed by a computing device (e.g., a processor, processing circuit, and/or other suitable component) of a wireless communication device, such as the BSs 105 and 700 and the central entity 1410. The method 2300 may employ similar mechanisms as in the methods 500, 800, 900, 1000, 1100, 1200, 1300, 1400, 1500, 1600, and 2100 described with respect to FIGS. 5, 8, 9, 10, 11, 12, 13, 14, 15, 16, and 21, respectively. As illustrated, the method 2300 includes a number of enumerated steps, but embodiments of the method 2300 may include additional steps before, after, and in between the enumerated steps. In some embodiments, one or more of the enumerated steps may be omitted or performed in a different order.

At step 2310, the method 2300 includes receiving, by a central entity from one or more wireless relay devices (e.g., the BSs 105 and 700, the UEs 115 and 600, and the relay nodes 1310), synchronization information associated with the one or more wireless relay devices. The synchronization information may include frequency information and/or timing information associated with synchronization references of the one or more wireless relay devices.

At step 2320, the method 2300 includes determining, by the central entity, a synchronization reference adjustment based on at least some of the synchronization information. The adjustment may include a gap period, a cyclic prefix configuration, a timing synchronization adjustment, a frequency synchronization adjustment, a transmit timing adjustment, and/or a receive timing adjustment.

At step 2330, the method 2300 includes transmitting, by the central entity, a message instructing a first wireless relay device of the one or more wireless relay devices to communicate with a second wireless relay device of the one or more wireless relay devices based on the synchronization reference adjustment.

In an embodiment, the central entity can collect reports from the one or more wireless relay devices. The reports can include at least one of capability information of the one or more wireless relay devices, scheduling information of the one or more wireless relay devices, transmit-receive switching requirements of the one or more wireless relay devices, synchronization reference switching requirements of the one or more wireless relay devices, or priority levels associated with synchronization reference sources of the one or more wireless relay devices. The central entity can determine at least one of the gap period or the cyclic prefix configuration for the first wireless relay device to communicate with the second wireless relay device based on the reports.

In an embodiment, the first wireless communication device and the second wireless communication devices may both be BSs, where the adjustment is for backhaul communication. For example, the first wireless communication device may be a parent node or an ACF-node of the second wireless communication device. Alternatively, the first wireless communication device may be a child node or a UEF-node of the second wireless communication device.

In an embodiment, the first wireless communication device may be a BS and the second wireless communication device may be a UE, where the adjustment is for access communication.

In another embodiment, the first wireless communication device may be a UE and the second wireless communication device may be a BS, where the adjustment is for access communication.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure further include a computer-readable medium having program code recorded thereon, the program code comprising code for causing a first wireless communication device to receive synchronization information associated with one or more wireless relay devices; code for causing the first wireless communication device to adjust one or more synchronization references based on at least some of the synchronization information; and code for causing the first wireless communication device to communicate, with the one or more wireless relay devices, communication signals based on the one or more adjusted synchronization references, wherein at least one of the communication signals includes backhaul traffic.

The computer-readable medium further includes wherein the code for causing the first wireless communication device to receive the synchronization information is further configured to receive, from a first wireless relay device of the one or more wireless relay devices, a message including at least one of timing information associated with a synchronization reference of the first wireless relay device, frequency information associated with the synchronization reference of the first wireless relay device, capability information of the first wireless relay device, scheduling information of the first wireless relay device, a transmit-receive switching requirement of the first wireless relay device, or a synchronization reference switching requirement of the first wireless relay device. The computer-readable medium further includes wherein the code for causing the first wireless communication device to receive the synchronization information is further configured to receive, from a first wireless relay device of the one or more wireless relay devices, a synchronization reference signal that is based on a synchronization reference of the first wireless relay device. The computer-readable medium further includes wherein the code for causing the first wireless communication device to receive the synchronization information is further configured to receive priority levels associated with sources of the synchronization information, and wherein the adjusting includes adjusting the one or more synchronization references based on the priority levels. The computer-readable medium further includes wherein the code for causing the first wireless communication device to receive the synchronization information is further configured to receive priority levels associated with hop counts of the one or more wireless relay devices with respect to original sources of corresponding synchronization references, and wherein the adjusting includes adjusting the one or more synchronization references based on the priority levels. The computer-readable medium further includes wherein the code for causing the first wireless communication device to receive the synchronization information is further configured to receive, from a central entity, the synchronization information. The computer-readable medium further includes code for causing the first wireless communication device to receive, from an external synchronization source, at least one of timing information or frequency information; and code for causing the first wireless communication device to adjust the one or more synchronization references further based on the at least one of timing information or frequency information. The computer-readable medium further includes wherein the external synchronization source includes at least one of a global positioning system (GPS) or a synchronization source of another radio access technology (RAT). The computer-readable medium further includes code for causing the first wireless communication device to transmit a message requesting for the synchronization information. The computer-readable medium further includes code for causing the first wireless communication device to transmit synchronization information associated with the one or more synchronization references based on at least one of a schedule, a synchronization information request, a measurement of the one or more synchronization references, or the adjusting of the one or more synchronization references. The computer-readable medium further includes code for causing the first wireless communication device to relay, to an anchoring wireless communication device that is in communication with a core network via an optical fiber link, a first communication signal of the communication signals, wherein the code for causing the first wireless communication device to communicate the communication signals is further configured to transmit, to a first wireless relay device of the one or more wireless relay devices, a second communication signal based on a downlink transmit timing of the anchoring wireless communication device. The computer-readable medium further includes wherein the code for causing the first wireless communication device to communicating the communication signals is further configured to communicate, with a first wireless relay device of the one or more wireless relay devices, a second communication signal of the communication signals including access traffic. The computer-readable medium further includes code for causing the first wireless communication device to transmit a message requesting the one or more wireless relay devices to resynchronize to the one or more adjusted synchronization references. The computer-readable medium further includes code for causing the first wireless communication device to transmit a configuration for resynchronizing to the one or more adjusted synchronization references. The computer-readable medium further includes code for causing the first wireless communication device to determine a first gap period based on at least one of a capability parameter of a first wireless relay device of the one or more wireless relay devices, scheduling information of the first wireless relay device, a transmit-receive switching requirement of the first wireless relay device, or a synchronization reference switching requirement of the first wireless relay device; and code for causing the first wireless communication device to determine a second gap period based on at least one a capability parameter of a second wireless relay device of the one or more wireless relay devices, scheduling information of the second wireless relay device, a transmit-receive switching requirement of the second wireless relay device, or a synchronization reference switching requirement of the second wireless relay device, the second gap period different from the first gap period. The computer-readable medium further includes wherein the code for causing the first wireless communication device to communicate the communication signals is further configured to transmit, to the first wireless relay device, a message indicating the first gap period; transmit, to the second wireless relay device, a message indicating the second gap period; communicate with the first wireless relay device based on the first gap period; and communicate with the second wireless relay device based on the second gap period. The computer-readable medium further includes wherein the code for causing the first wireless communication device to communicate the communication signals by switching from a normal cyclic prefix to an extended cyclic prefix based on at least one of capability parameters of the one or more wireless relay devices, transmit-receive switching requirements of the one or more wireless relay devices, synchronization reference switching requirements of the one or more wireless relay devices, or synchronization references of the one or more wireless relay devices. The computer-readable medium further includes wherein the code for causing the first wireless communication device to communicate the communication signals is further configured to communicate, with a first wireless relay device of the one or more wireless relay devices, a first communication signal based on a first synchronization reference of the one or more synchronization references; and communicate, with a second wireless relay device of the one or more wireless relay devices, a second communication signal based on a second synchronization reference of the one or more synchronization references that is different than the first synchronization reference. The computer-readable medium further includes wherein the code for causing the first wireless communication device to communicate the communication signals is further configured to communicate the first communication signal in concurrent with the second communication signal. The computer-readable medium further includes wherein the code for causing the first wireless communication device to communicate the communication signals is further configured to communicate, with a first wireless relay device of the one or more wireless relay devices, a first communication signal of the communication signals during a first time period based on a first synchronization reference of the one or more synchronization references; and communicate, with a second wireless relay device of the one or more wireless relay devices, a second communication signal of the communication signals during a second time period subsequent to the first time period based on a second synchronization reference of the one or more synchronization references that is different than the first synchronization reference.

Embodiments of the present disclosure further include a computer-readable medium having program code recorded thereon, the program code comprising code for causing a central unit to receive, from one or more wireless relay devices, synchronization information associated with the one or more wireless relay devices; code for causing the central unit to determine a synchronization reference adjustment based on at least some of the synchronization information; and code for causing the central unit to transmit a message to instruct a first wireless relay device of the one or more wireless relay devices to communicate with a second wireless relay device of the one or more wireless relay devices based on the synchronization reference adjustment.

The computer-readable medium further includes wherein the code for causing the central unit to receive the synchronization information is further configured to receive at least one of frequency information associated with synchronization references of the one or more wireless relay devices or timing information associated with the synchronization references of the one or more wireless relay devices. The computer-readable medium further includes wherein the code for causing the central unit to transmit the message is further configured to transmit the synchronization reference adjustment including at least one of a gap period, a cyclic prefix configuration, a timing synchronization adjustment, a frequency synchronization adjustment, a transmit timing adjustment, or a receive timing adjustment. The computer-readable medium further includes code for causing the central unit to receive, from the one or more wireless relay devices, reports including at least one of capability information of the one or more wireless relay devices, scheduling information of the one or more wireless relay devices, transmit-receive switching requirements of the one or more wireless relay devices, synchronization reference switching requirements of the one or more wireless relay devices, or priority levels associated with synchronization reference sources of the one or more wireless relay devices; and code for causing the central unit to determine at least one of the gap period or the cyclic prefix configuration for the first wireless relay device to communicate with the second wireless relay device based on the reports.

Embodiments of the present disclosure further include an apparatus comprising means (e.g., the transceivers 610 and 710 and antennas 616 and 716) for receiving synchronization information associated with one or more wireless relay devices; means (e.g., processors 602 and 702) for adjusting one or more synchronization references based on at least some of the synchronization information; and means (e.g., the transceivers 610 and 710 and antennas 616 and 716) for communicating, with the one or more wireless relay devices, communication signals based on the one or more adjusted synchronization references, wherein at least one of the communication signals includes backhaul traffic.

The apparatus further includes wherein means for receiving the synchronization information is further configured to receive, from a first wireless relay device of the one or more wireless relay devices, a message including at least one of timing information associated with a synchronization reference of the first wireless relay device, frequency information associated with the synchronization reference of the first wireless relay device, capability information of the first wireless relay device, scheduling information of the first wireless relay device, a transmit-receive switching requirement of the first wireless relay device, or a synchronization reference switching requirement of the first wireless relay device. The apparatus further includes wherein the means for receiving the synchronization information is further configured to receive, from a first wireless relay device of the one or more wireless relay devices, a synchronization reference signal that is based on a synchronization reference of the first wireless relay device. The apparatus further includes wherein the means for receiving the synchronization information is further configured to receive priority levels associated with sources of the synchronization information, and wherein the adjusting includes adjusting the one or more synchronization references based on the priority levels. The apparatus further includes wherein the means for receiving the synchronization information is further configured to receive priority levels associated with hop counts of the one or more wireless relay devices with respect to original sources of corresponding synchronization references, and wherein the adjusting includes adjusting the one or more synchronization references based on the priority levels. The apparatus further includes wherein the means for receiving the synchronization information is further configured to receive, from a central entity, the synchronization information. The apparatus further includes means (e.g., the transceivers 610 and 710 and antennas 616 and 716) for receiving from an external synchronization source, at least one of timing information or frequency information, and wherein the means for adjusting the one or more synchronization references to adjust the one or more synchronization references further based on the at least one of timing information or frequency information. The apparatus further includes wherein the external synchronization source includes at least one of a global positioning system (GPS) or a synchronization source of another radio access technology (RAT). The apparatus further includes means (e.g., the transceivers 610 and 710 and antennas 616 and 716) for transmitting a message requesting for the synchronization information. The apparatus further includes means (e.g., the transceivers 610 and 710 and antennas 616 and 716) for transmitting synchronization information associated with the one or more synchronization references based on at least one of a schedule, a synchronization information request, a measurement of the one or more synchronization references, or the adjusting of the one or more synchronization references. The apparatus further includes means (e.g., the transceivers 610 and 710 and antennas 616 and 716) for relaying, to an anchoring wireless communication device that is in communication with a core network via an optical fiber link, a first communication signal of the communication signals, wherein the means for communicating the communication signals is further configured to transmit, to a first wireless relay device of the one or more wireless relay devices, a second communication signal based on a downlink transmit timing of the anchoring wireless communication device. The apparatus further includes wherein the means for communicating the communication signals is further configured to communicate, with a first wireless relay device of the one or more wireless relay devices, a second communication signal of the communication signals including access traffic. The apparatus further includes means (e.g., the transceivers 610 and 710 and antennas 616 and 716) for transmitting a message requesting the one or more wireless relay devices to resynchronize to the one or more adjusted synchronization references. The apparatus further includes means (e.g., the transceivers 610 and 710 and antennas 616 and 716) for transmitting a configuration for resynchronizing to the one or more adjusted synchronization references. The apparatus further includes means (e.g., processors 602 and 702) for determining a first gap period based on at least one of a capability parameter of a first wireless relay device of the one or more wireless relay devices, scheduling information of the first wireless relay device, a transmit-receive switching requirement of the first wireless relay device, or a synchronization reference switching requirement of the first wireless relay device; and means (e.g., processors 602 and 702) for determining a second gap period based on at least one of a capability parameter of a second wireless relay device of the one or more wireless relay devices, scheduling information of the second wireless relay device, a transmit-receive switching requirement of the second wireless relay device, or a synchronization reference switching requirement of the second wireless relay device, the second gap period different from the first gap period. The apparatus further includes wherein the means for communicating the communication signals is further configured to transmit, to the first wireless relay device, a message indicating the first gap period; transmit, to the second wireless relay device, a message indicating the second gap period; communicate with the first wireless relay device based on the first gap period; and communicate with the second wireless relay device based on the second gap period. The apparatus further includes wherein the means for communicating the communication signals is further configured to switch from a normal cyclic prefix to an extended cyclic prefix based on at least one of capability parameters of the one or more wireless relay devices, transmit-receive switching requirements of the one or more wireless relay devices, synchronization reference switching requirements of the one or more wireless relay devices, or synchronization references of the one or more wireless relay devices. The apparatus further includes wherein the means for communicating the communication signals is further configured to communicate, with a first wireless relay device of the one or more wireless relay devices, a first communication signal based on a first synchronization reference of the one or more synchronization references; and communicate, with a second wireless relay device of the one or more wireless relay devices, a second communication signal based on a second synchronization reference of the one or more synchronization references that is different than the first synchronization reference. The apparatus further includes wherein the means for communicating the communication signals is further configured to communicate the first communication signal in concurrent with the second communication signal. The apparatus further includes wherein the means for communicating the communication signals is further configured to communicate, with a first wireless relay device of the one or more wireless relay devices, a first communication signal of the communication signals during a first time period based on a first synchronization reference of the one or more synchronization references; and communicate, with a second wireless relay device of the one or more wireless relay devices, a second communication signal of the communication signals during a second time period subsequent to the first time period based on a second synchronization reference of the one or more synchronization references that is different than the first synchronization reference.

Embodiments of the present disclosure further include an apparatus comprising means (e.g., the transceivers 610 and 710 and antennas 616 and 716) for receiving, from one or more wireless relay devices, synchronization information associated with one or more wireless relay devices; means (e.g., processors 602 and 702) for determining a synchronization reference adjustment based on at least some of the synchronization information; and means (e.g., the transceivers 610 and 710 and antennas 616 and 716) for transmitting a message to instruct a first wireless relay device of the one or more wireless relay devices to communicate with a second wireless relay device of the one or more wireless relay devices based on the synchronization reference adjustment.

The apparatus further includes wherein the means for receiving the synchronization information is further configured to receive at least one of frequency information associated with synchronization references of the one or more wireless relay devices or timing information associated with the synchronization references of the one or more wireless relay devices. The apparatus further includes wherein the message includes the synchronization reference adjustment including at least one of a gap period, a cyclic prefix configuration, a timing synchronization adjustment, a frequency synchronization adjustment, a transmit timing adjustment, or a receive timing adjustment. The apparatus further includes means (e.g., the transceivers 610 and 710 and antennas 616 and 716) for receiving, from the one or more wireless relay devices, reports including at least one of capability information of the one or more wireless relay devices, scheduling information of the one or more wireless relay devices, transmit-receive switching requirements of the one or more wireless relay devices, synchronization reference switching requirements of the one or more wireless relay devices, or priority levels associated with synchronization reference sources of the one or more wireless relay devices; and means (e.g., processors 602 and 702) for determining at least one of the gap period or the cyclic prefix configuration for the first wireless relay device to communicate with the second wireless relay device based on the reports.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communication device, synchronization information associated with one or more wireless relay devices;
adjusting, by the first wireless communication device, one or more synchronization references of the first wireless communication device based on at least a subset of the received synchronization information; and
communicating, by the first wireless communication device with the one or more wireless relay devices, communication signals in synchronization with the one or more adjusted synchronization references, wherein at least one of the communication signals includes backhaul data.

2. The method of claim 1, wherein the receiving includes:
receiving, by the first wireless communication device from a first wireless relay device of the one or more wireless relay devices, a message including at least one of timing information associated with a synchronization reference of the first wireless relay device or frequency information associated with the synchronization reference of the first wireless relay device.

3. The method of claim 1, wherein the receiving includes:
receiving, by the first wireless communication device from a first wireless relay device of the one or more wireless relay devices, a synchronization reference signal that is based on a synchronization reference of the first wireless relay device.

4. The method of claim 1,
wherein the receiving includes:
receiving priority levels associated with sources of the synchronization information, and
wherein the adjusting includes:
selecting the subset of the received synchronization information based on the priority levels.

5. The method of claim 1,
wherein the receiving includes:
receiving priority levels associated with hop counts of the one or more wireless relay devices with respect to an original synchronization reference source, and
wherein the adjusting includes:
selecting the subset of the received synchronization information based on the priority levels.

6. The method of claim 1, wherein the receiving includes:
receiving, by the first wireless communication device from a central entity, the synchronization information.

7. The method of claim 1, further comprising:
receiving, by the first wireless communication device from an external synchronization source, at least one of timing information or frequency information of the external synchronization source; and
adjusting the one or more synchronization references further based on the at least one of timing information or frequency information of the external synchronization source.

8. The method of claim 1, further comprising:
transmitting, by the first wireless communication device, a message requesting the synchronization information.

9. The method of claim 1, further comprising:
transmitting, by the first wireless communication device, synchronization information associated with the one or more synchronization references based on at least one of a schedule, a synchronization information request, a measurement of the one or more synchronization references, or the adjusting of the one or more synchronization references.

10. The method of claim 1, further comprising:
communicating, by the first wireless communication device with a second wireless communication device, a second communication signal including access data.

11. The method of claim 1, further comprising:
transmitting, by the first wireless communication device, a message requesting the one or more wireless relay devices to resynchronize to the one or more adjusted synchronization references.

12. The method of claim 1, wherein the communicating includes:
communicating, by the first wireless communication device with a first wireless relay device of the one or more wireless relay devices, a first communication signal based on a first synchronization reference of the one or more synchronization references; and
communicating, by the first wireless communication device with a second wireless communication device, a second communication signal based on a second synchronization reference of the one or more synchronization references that is different than the first synchronization reference.

13. The method of claim 12, wherein the communicating includes communicating the first communication signal concurrent with the second communication signal.

14. The method of claim 12, wherein the communicating includes communicating the first communication signal and the second communication signal during different time periods.

15. A method of wireless communication, comprising:
receiving, by a central entity from one or more wireless relay devices, synchronization information associated with the one or more wireless relay devices;
determining, by the central entity, a synchronization reference adjustment for a first wireless relay device of the one or more wireless relay devices based on at least a subset of the received synchronization information; and
transmitting, by the central entity, a message instructing the first wireless relay device of the one or more wireless relay devices to synchronize a communication with a second wireless relay device of the one or more wireless relay devices based on the synchronization reference adjustment.

16. The method of claim 15, wherein the receiving includes:
receiving at least one of frequency information or timing information associated with one or more synchronization references.

17. The method of claim 15,
wherein the receiving includes:
receiving priority levels associated with sources of the synchronization information, and
wherein the determining includes:
selecting the subset of the received synchronization information based on the priority levels.

18. The method of claim 15,
wherein the receiving includes:
receiving priority levels associated with hop counts of the one or more wireless relay devices with respect to an original synchronization reference source, and
wherein the determining includes:
selecting the subset of the received synchronization information based on the priority levels.

19. The method of claim 15, wherein the transmitting includes:
trasmitting, by the central entity, at least one of a timing adjustment or a frequency adjustment for a synchronization reference of the first wireless relay device.

20. An apparatus comprising:
a transceiver configured to receive synchronization information associated with one or more wireless relay devices; and
a processor configured to adjust one or more synchronization references of the apparatus based on at least a subset of the received synchronization information,
wherein the transceiver is further configured to communicate, with the one or more wireless relay devices, communication signals in synchronization with the one or more adjusted synchronization references, wherein at least one of the communication signals includes backhaul data.

21. The apparatus of claim 20, wherein the transceiver is further configured to receive the synchronization information by:
receiving, from a first wireless relay device of the one or more wireless relay devices, a message including at least one of timing information associated with a synchronization reference of the first wireless relay device or frequency information associated with the synchronization reference of the first wireless relay device.

22. The apparatus of claim 20, wherein the transceiver is further configured to receive the synchronization information by:
receiving, from a first wireless relay device of the one or more wireless relay devices, a synchronization reference signal that is based on a synchronization reference of the first wireless relay device.

23. The apparatus of claim 20,
wherein the transceiver is further configured to receive the synchronization information by:
receiving priority levels associated with sources of the synchronization information, and
wherein the processor is further configured to adjust the one or more synchronization references by:
selecting the subset of the received synchronization information based on the priority levels.

24. The apparatus of claim 20,
wherein the transceiver is further configured to receive the synchronization information by:
receiving priority levels associated with hop counts of the one or more wireless relay devices with respect to an original synchronization reference source, and
wherein the processor is further configured to adjust the one or more synchronization references by:
selecting the subset of the received synchronization information based on the priority levels.

25. The apparatus of claim 20, wherein the transceiver is further configured to receive the synchronization information by:
receiving, from a central entity, the synchronization information.

26. The apparatus of claim 20,
wherein the transceiver is further configured to:
receive, from an external synchronization source, at least one of timing information or frequency information of the external synchronization source, and
wherein the processor is further configured to:
adjust the one or more synchronization references further based on the at least one of timing information or frequency information of the external synchronization source.

27. The apparatus of claim 20, wherein the transceiver is further configured to:
transmit a message requesting the synchronization information.

28. The apparatus of claim 20, wherein the transceiver is further configured to:
transmit synchronization information associated with the one or more synchronization references based on at least one of a schedule, a synchronization information request, a measurement of the one or more synchronization references, or the adjustment of the one or more synchronization references.

29. The apparatus of claim 20, wherein the transceiver is further configured to:
communicate, with a wireless communication device, a second communication signal including access data.

30. The apparatus of claim 20, wherein the transceiver is further configured to:
transmit a message requesting the one or more wireless relay devices to resynchronize to the one or more adjusted synchronization references.

31. The apparatus of claim 20, wherein the transceiver is further configured to communicate the communication signals by:
communicating, with a first wireless relay device of the one or more wireless relay devices, a first communication signal of the communication signals based on a first synchronization reference of the one or more synchronization references; and
communicating, with a wireless communication device, a second communication signal of the communication signals based on a second synchronization reference of the one or more synchronization references that is different than the first synchronization reference.

32. The apparatus of claim 31, wherein the communicating includes communicating the first communication signal concurrent with the second communication signal.

33. The apparatus of claim 31, wherein the communicating includes communicating the first communication signal and the second communication signal during different time periods.

34. An apparatus comprising:
a transceiver configured to receive, from one or more wireless relay devices, synchronization information associated with the one or more wireless relay devices; and
a processor configured to determine a synchronization reference adjustment for a first wireless relay device of the one or more wireless relay devices based on at least a subset of the received synchronization information,
wherein the transceiver is further configured to transmit a message instructing the first wireless relay device of the one or more wireless relay devices to synchronize a communication with a second wireless relay device of the one or more wireless relay devices based on the synchronization reference adjustment.

35. The apparatus of claim 34, wherein the transceiver is further configured to receive the synchronization by:
receiving at least one of frequency information or timing information associated with one or more synchronization references.

36. The apparatus of claim 34,
- wherein the transceiver is further configured to receive the synchronization by:
    - receiving priority levels associated with sources of the synchronization information, and
- wherein the processor is further configured to determine the synchronization reference adjustment by:
    - selecting the subset of the received synchronization information based on the priority levels.

37. The apparatus of claim 34,
- wherein the transceiver is further configured to receive the synchronization by:
    - receiving priority levels associated with hop counts of the one or more wireless relay devices with respect to an original synchronization reference source, and
- wherein the processor is further configured to determine the synchronization reference adjustment by:
    - selecting the subset of the received synchronization information based on the priority levels.

38. The apparatus of claim 34, wherein the transceiver is further configured to transmit the message by:
- transmitting the message including at least one of a timing adjustment or a frequency adjustment for a synchronization reference of the first wireless relay device.

* * * * *